United States Patent
Huang et al.

(10) Patent No.: US 10,944,984 B2
(45) Date of Patent: Mar. 9, 2021

(54) AFFINE MOTION PREDICTION

(71) Applicant: QUALCOMM Incorporated, San Diego, CA (US)

(72) Inventors: Han Huang, San Diego, CA (US); Wei-Jung Chien, San Diego, CA (US); Marta Karczewicz, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/550,910

(22) Filed: Aug. 26, 2019

(65) Prior Publication Data

US 2020/0077113 A1      Mar. 5, 2020

Related U.S. Application Data

(60) Provisional application No. 62/723,919, filed on Aug. 28, 2018, provisional application No. 62/728,489, (Continued)

(51) Int. Cl.
*H04N 19/52* (2014.01)
*H04N 19/176* (2014.01)
(Continued)

(52) U.S. Cl.
CPC .......... *H04N 19/52* (2014.11); *H04N 19/176* (2014.11); *H04N 19/46* (2014.11); *H04N 19/55* (2014.11)

(58) Field of Classification Search
CPC ........ H04N 19/52; H04N 19/55; H04N 19/46; H04N 19/176; H04N 19/105; H04N 19/96;
(Continued)

(56) References Cited

U.S. PATENT DOCUMENTS

| 2014/0192881 A1* | 7/2014 | Xu | H04N 19/52 |
| | | | 375/240.16 |
| 2015/0078456 A1* | 3/2015 | Hannuksela | H04N 19/42 |
| | | | 375/240.25 |

(Continued)

FOREIGN PATENT DOCUMENTS

| WO | 2017118409 A1 | 7/2017 |
| WO | 2017148345 A1 | 9/2017 |

(Continued)

OTHER PUBLICATIONS

Sze V. et al. "High Efficiency Video Coding (HEVC) Algorithms and Architectures" in Integrated Circuits and Systems. New York, NY, USA: Springer-Verlag, 2014, pp. 1-375 (Year: 2014).*

(Continued)

*Primary Examiner* — Richard A Hansell, Jr.
(74) *Attorney, Agent, or Firm* — Shumaker & Sieffert, P.A.

(57) ABSTRACT

A video encoder and video decoder are configured to encode and decode blocks of video data using affine motion prediction. Affine motion prediction may include predicting control point motion vectors using an affine advanced motion vector prediction (AMVP) motion vector predictor list. The video encoder and video decoder may be configured to construct the affine AMVP motion vector predictor list of candidate control point motion vectors for the block of video data, wherein the affine AMVP motion vector predictor list includes one or more affine motion vector predictors that have all control point motion vectors equal to a designated motion vector.

44 Claims, 15 Drawing Sheets

Related U.S. Application Data filed on Sep. 7, 2018, provisional application No. 62/730,814, filed on Sep. 13, 2018.

(51) Int. Cl.
*H04N 19/46* (2014.01)
*H04N 19/55* (2014.01)

(58) Field of Classification Search
CPC .... H04N 19/11; H04N 19/107; H04N 19/167; H04N 19/70; H04N 19/54
See application file for complete search history.

(56) References Cited

U.S. PATENT DOCUMENTS

| | | | |
|---|---|---|---|
| 2017/0332095 A1* | 11/2017 | Zou | H04N 19/124 |
| 2018/0098063 A1* | 4/2018 | Chen | H04N 19/52 |
| 2018/0192069 A1 | 7/2018 | Chen et al. | |
| 2018/0295381 A1 | 10/2018 | Chen et al. | |
| 2019/0028731 A1* | 1/2019 | Chuang | H04N 19/105 |
| 2019/0089975 A1* | 3/2019 | Liu | H04N 19/573 |
| 2019/0158870 A1* | 5/2019 | Xu | H04N 19/51 |
| 2019/0306526 A1* | 10/2019 | Cho | H04N 19/513 |
| 2020/0029089 A1* | 1/2020 | Xu | H04N 19/61 |
| 2020/0059651 A1* | 2/2020 | Lin | H04N 19/54 |

FOREIGN PATENT DOCUMENTS

| | | |
|---|---|---|
| WO | 2017157259 A1 | 9/2017 |
| WO | 2017200771 A1 | 11/2017 |
| WO | 2018127625 A1 | 7/2018 |

OTHER PUBLICATIONS

Bross B., et al., "Versatile Video Coding (Draft 1)", Joint Video Experts Team (JVET) of ITU-T SG 16 WP 3 and ISO/IEC JTC 1/SC 29/WG 11, 10th Meeting, Apr. 2018, JVET-J1001-v1, 40 pages.

Chen J., et al., "Algorithm description for Versatile Video Coding and Test Model 1 (VTM 1)", Joint Video Experts Team (JVET) of ITU-T SG 16 WP 3 and ISO/IEC JTC 1/SC 29/WG 11, 10th Meeting: San Diego, US, Apr. 10-20, 2018, JVET-J1002-v1, 7 pages.

Chen J., et al., "Algorithm Description of Joint Exploration Test Model 1", Joint Video Exploration Team (JVET) of ITU-T SG 16 WP 3 and ISO/IEC JTC 1/SC 29/WG 11, 1nd Meeting: Geneva, CH, Oct. 19-21, 2015, 27 pages, JVET-A1001.

Ergen S., "ZigBee/IEEE 802.15.4 Summary", Sep. 10, 2004, 37 pp.

Huang H., et al., (QUALCOMM): "CE4-related: Affine Clean-up and Constrained Affine Inheritance for Local and Line Buffer Reduction", 124th MPEG Meeting; Oct. 8, 2018-Oct. 12, 2018; Macao; (Motion Picture Expert Group or ISO/IEC JTC1/SC29/WG11), No. m45143, Oct. 8, 2018, XP030215813, Retrieved from the Internet: URL:http://phenix.int-evry.fr/mpeg/doc_end_user/documents/124_Macao/wg11/m45143-JVET-L0690-v1-JVET-L069B . . . JVET-L0690/JVET-L0690.docx [retrieved on Oct. 8, 2018], 4 pages.

IEEE Std 802.11ad-2012: "Part 11: Wireless LAN Medium Access Control (MAC) and Physical Layer (PHY) Specifications—Amendment 3: Enhancements for Very High Throughput in the 60 GHz Band", LAN/MAN Standards Committee of the IEEE Computer Society, Dec. 28, 2012, 628 pages.

International Search Report and Written Opinion—PCT/US2019/048260—ISA/EPO—dated Dec. 16, 2019.

ITU-T H.223, Series H: Audiovisual and Multimedia Systems, Infrastructure of Audiovisual Services—Transmission Multiplexing and Synchronization, Multiplexing Protocol for Low Bit Rate Multimedia Communication, The International Telecommunication Union, Jul. 2001, 74 pp.

ITU-T H.265, Series H: Audiovisual and Multimedia Systems, Infrastructure of audiovisual services—Coding of moving video, Advanced video coding for generic audiovisual services, The International Telecommunication Union. Dec. 2016, 664 pp.

Jeong S., et al., "CE4 Ultimate motion vector expression in J0024 (Test 4.2.9)", Joint Video Experts Team (JVET) of ITU-T SG 16 WP 3 and ISO/IEC JTC 1/SC 29/WG 11, JVET-K0115-v1, 11th Meeting: Ljubljana, SI, Jul. 10-18, 2018, 6 pages.

U.S. Appl. No. 62/697,860, by Han Huang, filed Jul. 13, 2018.

Huang H., et al., "CE4.1.6: Simplification of Affine AMVP Candidate List Construction", Joint Video Experts Team (JVET) of ITU-T SG 16 WP 3 and ISO/IEC JTC 1/SC 29/WG 11, JVET-L0271-r1, 12th Meeting: Macao, CN, Oct. 3-12, 2018, Qualcomm Inc, pp. 1-4.

Huang (QUALCOMM) H., et al., "CE4: Test Results of CE4.1.10 and CE4.1.13", 12. JVET_MEETING; Oct. 3, 2018-Oct. 12, 2018; Macao, CN (The Joint Video Exploration Team of ISO/IEC JTC1/SC29/WG11 and ITU-T SG.16), No. JVET-L0273, Sep. 25, 2018, XP030193810, 6 Pages, Retrieved from the Internet: URL: http://phenix.int-evry.fr./jvet/doc_end_user/documents/12_Macao/wg11/JVET-L0273-v1.zip JVET-L0273-CE4.1.10 and CE4.1.13.docx [retrieved on Sep. 25, 2018] the whole document.

\* cited by examiner

AFFINE MOTION PREDICTION

This application claims the benefit of U.S. Provisional Application No. 62/723,919, filed Aug. 28, 2018, U.S. Provisional Application No. 62/728,489, filed Sep. 7, 2018, and U.S. Provisional Application No. 62/730,814, filed Sep. 13, 2018, the entire content of each of which is incorporated by reference herein.

TECHNICAL FIELD

This disclosure relates to video encoding and video decoding.

BACKGROUND

Digital video capabilities can be incorporated into a wide range of devices, including digital televisions, digital direct broadcast systems, wireless broadcast systems, personal digital assistants (PDAs), laptop or desktop computers, tablet computers, e-book readers, digital cameras, digital recording devices, digital media players, video gaming devices, video game consoles, cellular or satellite radio telephones, so-called "smart phones," video teleconferencing devices, video streaming devices, and the like. Digital video devices implement video coding techniques, such as those described in the standards defined by MPEG-2, MPEG-4, ITU-T H.263, ITU-T H.264/MPEG-4, Part 10, Advanced Video Coding (AVC), the High Efficiency Video Coding (HEVC) standard, ITU-T H.265/High Efficiency Video Coding (HEVC), and extensions of such standards. The video devices may transmit, receive, encode, decode, and/or store digital video information more efficiently by implementing such video coding techniques.

Video coding techniques include spatial (intra-picture) prediction and/or temporal (inter-picture) prediction to reduce or remove redundancy inherent in video sequences. For block-based video coding, a video slice (e.g., a video picture or a portion of a video picture) may be partitioned into video blocks, which may also be referred to as coding tree units (CTUs), coding units (CUs) and/or coding nodes. Video blocks in an intra-coded (I) slice of a picture are encoded using spatial prediction with respect to reference samples in neighboring blocks in the same picture. Video blocks in an inter-coded (P or B) slice of a picture may use spatial prediction with respect to reference samples in neighboring blocks in the same picture or temporal prediction with respect to reference samples in other reference pictures. Pictures may be referred to as frames, and reference pictures may be referred to as reference frames.

SUMMARY

In general, this disclosure describes techniques related to inter prediction in video codecs. More specifically, this disclosure describes methods and devices for performing affine motion prediction techniques. Affine motion prediction is a motion prediction technique that uses models of more complex motion (e.g., rotation, scaling, zoom, etc.) as compared to simple translational motion (e.g., subtracting the (x,y) location of a predictor block from the (x,y) location of the currently coded block). Multiple affine motion models may be used in affine motion prediction. For example, a 4-parameter affine motion model may use two motion vectors (called control point motion vectors) determined at two corners of a block. The x and y components of each control point motion vector are parameters in the 4-parameter affine motion model. A 6-parameter affine motion model may use three control point motion vectors at three corners of a block.

Rather than coding the control point motion vectors for each block, a video coder may be configured to predict the values of the control point motion vectors from control point motion vectors and/or normal (e.g., translational) motion vectors from neighboring blocks. Such control point motion vectors and/or normal (e.g., translational) motion vectors from neighboring blocks may be referred to as affine motion vector predictors. A video encoder and a video decoder may be configured to construct a list of affine motion vector predictors based on some predetermined rules. The video encoder would then instruct the video decoder on which affine motion vector predictor in the list to use by signaling an index value into the list.

Affine motion vector predictors may include two example types: inherited affine motion vector predictors and constructed affine motion vector predictors. Inherited affine motion vector predictors are derived from control point motion vectors of a neighboring block. Constructed affine motion vector predictors are derived from normal (e.g., translational) motion vectors of neighboring blocks. As such, inherited affine motion vector predictors came from neighboring blocks coded using affine motion prediction, while constructed affine motion vector predictors come from neighboring blocks coded using normal (e.g., translational) motion prediction (generally, inter prediction).

Affine motion vector prediction may be performed in one of several prediction modes, including an advanced motion vector prediction (AMVP) mode and a merge mode. In both affine AMVP mode and affine merge mode, a video coder constructs an affine motion vector predictor list. However, the techniques for constructing the list may be different for each mode. In affine AMVP mode, in addition to identifying the affine motion vector predictor from the list that was used, a motion vector difference is also signaled. The motion vector difference is the difference between the value of an actual control point motion vector determined for the current block and the value of the affine motion vector predictor. In affine merge mode, no motion vector difference is sent. Rather, the value of the indicated affine motion vector predictor is used as the control point motion vector for the block.

In some examples, this disclosure describes techniques for constructing an affine motion vector predictor list for affine AMVP mode. In one example, the affine motion vector predictor list is constructed using the following techniques. First, a video coder inserts one or more inherited affine motion vector predictors derived from neighboring candidate blocks, if available. If the number of existing predictors in the list is less than a predefined maximum number, the video coder inserts constructed affine motion vector predictors, if available. If the number of existing predictors in the list is still less than the predefined maximum number, the video coder inserts the affine motion vector predictors that have all the control point motion vectors (MVs) equal to one designated MV. As such, for some example blocks, an affine motion vector predictor list may include one of an inherited affine motion vector predictors or a constructed affine motion vector predictors, along with an affine motion vector predictor that has all the control point MVs equal to one designated MV.

In one example of the disclosure, a method of decoding video data comprises receiving a block of video data encoded using affine advanced motion vector prediction (AMVP) mode, constructing an affine AMVP motion vector predictor list of candidate control point motion vectors for the block of video data, the affine AMVP motion vector predictor list including one or more affine motion vector predictors that have all control point motion vectors equal to a designated motion vector, determining control point motion vectors for the block of video data from the affine AMVP motion vector predictor list, and decoding the block of video data using the determined control point motion vectors.

In another example of the disclosure, an apparatus configured to decode video data comprises a memory configured to store a block of video data encoded using affine advanced motion vector prediction (AMVP) mode, and one or more processors in communication with the memory, the one or more processors configured to receive the block of video data, construct an affine AMVP motion vector predictor list of candidate control point motion vectors for the block of video data, the affine AMVP motion vector predictor list including one or more affine motion vector predictors that have all control point motion vectors equal to a designated motion vector, determine control point motion vectors for the block of video data from the affine AMVP motion vector predictor list, and decode the block of video data using the determined control point motion vectors.

In another example of the disclosure, an apparatus configured to decode video data comprises means for receiving a block of video data encoded using affine advanced motion vector prediction (AMVP) mode, means for constructing an affine AMVP motion vector predictor list of candidate control point motion vectors for the block of video data, the affine AMVP motion vector predictor list including one or more affine motion vector predictors that have all control point motion vectors equal to a designated motion vector, means for determining control point motion vectors for the block of video data from the affine AMVP motion vector predictor list, and means for decoding the block of video data using the determined control point motion vectors.

In another example, this disclosure describes a non-transitory computer-readable storage medium storing instructions that, when executed, cause one or more processors to receive a block of video data encoded using affine advanced motion vector prediction (AMVP) mode, construct an affine AMVP motion vector predictor list of candidate control point motion vectors for the block of video data, the affine AMVP motion vector predictor list including one or more affine motion vector predictors that have all control point motion vectors equal to a designated motion vector, determine control point motion vectors for the block of video data from the affine AMVP motion vector predictor list, and decode the block of video data using the determined control point motion vectors.

In another example of the disclosure, a method of encoding video data comprises receiving a block of video data to be encoded using affine advanced motion vector prediction (AMVP) mode, constructing an affine AMVP motion vector predictor list of candidate control point motion vectors for the block of video data, the affine AMVP motion vector predictor list including one or more affine motion vector predictors that have all control point motion vectors equal to a designated motion vector, determining control point motion vectors for the block of video data from the affine AMVP motion vector predictor list, and encoding the block of video data using the determined control point motion vectors.

In another example of the disclosure, an apparatus configured to encode video data comprises a memory configured to store a block of video data to be encoded using affine advanced motion vector prediction (AMVP) mode, and one or more processors in communication with the memory, the one or more processors configured to receive the block of video data, construct an affine AMVP motion vector predictor list of candidate control point motion vectors for the block of video data, the affine AMVP motion vector predictor list including one or more affine motion vector predictors that have all control point motion vectors equal to a designated motion vector, determine control point motion vectors for the block of video data from the affine AMVP motion vector predictor list, and encode the block of video data using the determined control point motion vectors.

In another example of the disclosure, an apparatus configured to encode video data comprises means for receiving a block of video data to be encoded using affine advanced motion vector prediction (AMVP) mode, means for constructing an affine AMVP motion vector predictor list of candidate control point motion vectors for the block of video data, the affine AMVP motion vector predictor list including one or more affine motion vector predictors that have all control point motion vectors equal to a designated motion vector, means for determining control point motion vectors for the block of video data from the affine AMVP motion vector predictor list, and means for encoding the block of video data using the determined control point motion vectors.

In another example, this disclosure describes a non-transitory computer-readable storage medium storing instructions that, when executed, cause one or more processors to receive a block of video data to be encoded using affine advanced motion vector prediction (AMVP) mode, construct an affine AMVP motion vector predictor list of candidate control point motion vectors for the block of video data, the affine AMVP motion vector predictor list including one or more affine motion vector predictors that have all control point motion vectors equal to a designated motion vector, determine control point motion vectors for the block of video data from the affine AMVP motion vector predictor list, and encode the block of video data using the determined control point motion vectors.

The details of one or more examples are set forth in the accompanying drawings and the description below. Other features, objects, and advantages will be apparent from the description, drawings, and claims.

DETAILED DESCRIPTION

Figure 1:
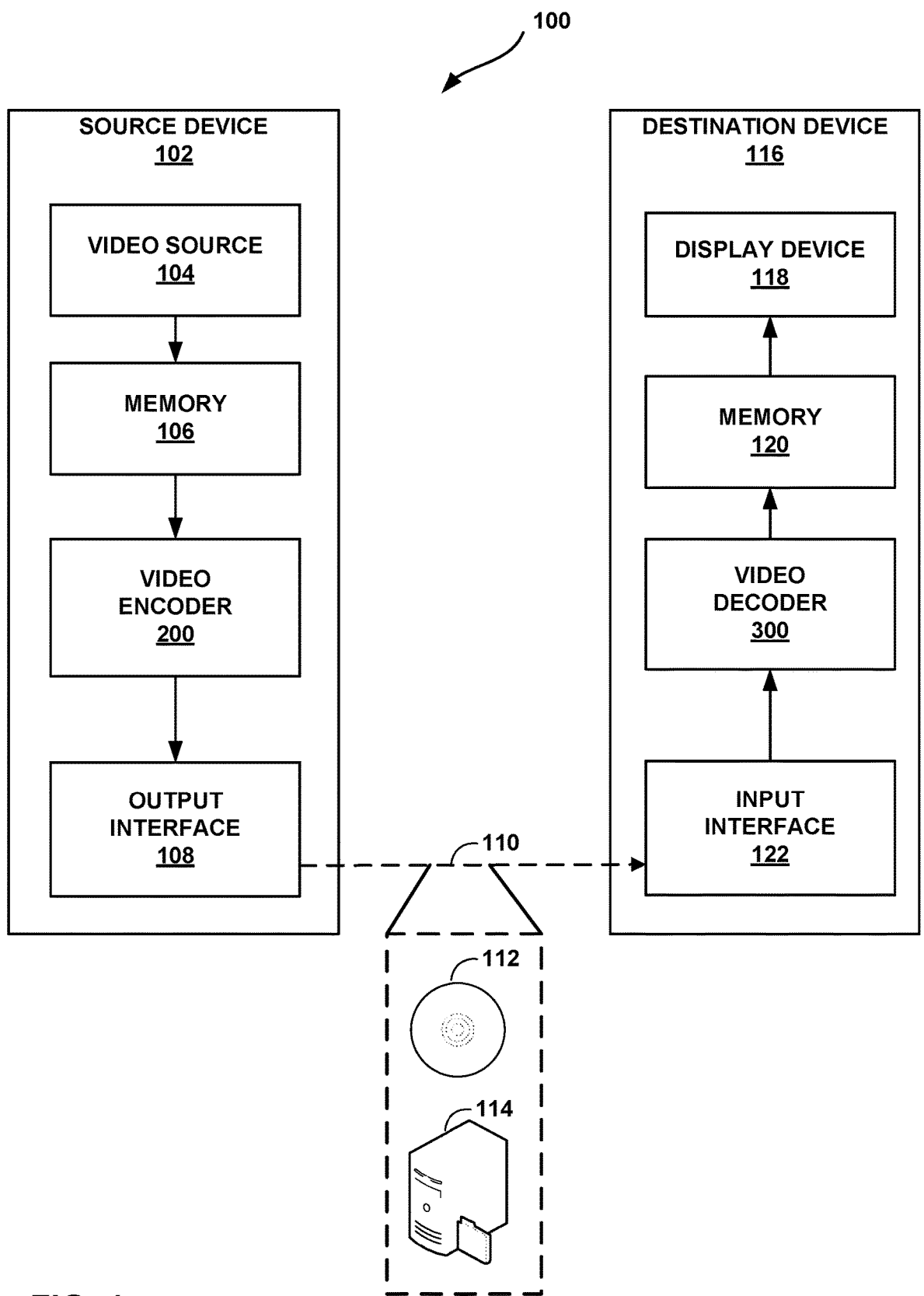
FIG. 1 is a block diagram illustrating an example video encoding and decoding system that may perform the techniques of this disclosure.

FIG. 1 is a block diagram illustrating an example video encoding and decoding system 100 that may perform the techniques of this disclosure. The techniques of this disclosure are generally directed to coding (encoding and/or decoding) video data. In general, video data includes any data for processing a video. Thus, video data may include raw, uncoded video, encoded video, decoded (e.g., reconstructed) video, and video metadata, such as signaling data.

As shown in FIG. 1, system 100 includes a source device 102 that provides encoded video data to be decoded and displayed by a destination device 116, in this example. In particular, source device 102 provides the video data to destination device 116 via a computer-readable medium 110. Source device 102 and destination device 116 may comprise any of a wide range of devices, including desktop computers, notebook (i.e., laptop) computers, tablet computers, set-top boxes, telephone handsets such as smartphones, televisions, cameras, display devices, digital media players, video gaming consoles, video streaming device, or the like. In some cases, source device 102 and destination device 116 may be equipped for wireless communication, and thus may be referred to as wireless communication devices.

In the example of FIG. 1, source device 102 includes video source 104 (e.g., a camera), memory 106, video encoder 200, and output interface 108. Destination device 116 includes input interface 122, video decoder 300, memory 120, and display device 118. In accordance with this disclosure, video encoder 200 of source device 102 and video decoder 300 of destination device 116 may be configured to apply the techniques for affine motion prediction. Thus, source device 102 represents an example of a video encoding device, while destination device 116 represents an example of a video decoding device. In other examples, a source device and a destination device may include other components or arrangements. For example, source device 102 may receive video data from an external video source, such as an external camera. Likewise, destination device 116 may interface with an external display device, rather than include an integrated display device.

System 100 as shown in FIG. 1 is merely one example. In general, any digital video encoding and/or decoding device may perform techniques for affine motion prediction. Source device 102 and destination device 116 are merely examples of such coding devices in which source device 102 generates coded video data for transmission to destination device 116. This disclosure refers to a "coding" device as a device that performs coding (encoding and/or decoding) of data. Thus, video encoder 200 and video decoder 300 represent examples of coding devices, in particular, a video encoder and a video decoder, respectively. In some examples, source devices 102 and destination device 116 may operate in a substantially symmetrical manner such that each of source device 102 and destination device 116 include video encoding and decoding components. Hence, system 100 may support one-way or two-way video transmission between source device 102 and destination device 116, e.g., for video streaming, video playback, video broadcasting, or video telephony.

In general, video source 104 represents a source of video data (i.e., raw, uncoded video data) and provides a sequential series of pictures (also referred to as "frames") of the video data to video encoder 200, which encodes data for the pictures. Video source 104 of source device 102 may include a video capture device, such as a video camera, a video archive containing previously captured raw video, and/or a video feed interface to receive video from a video content provider. As a further alternative, video source 104 may generate computer graphics-based data as the source video, or a combination of live video, archived video, and computer-generated video. In each case, video encoder 200 encodes the captured, pre-captured, or computer-generated video data. Video encoder 200 may rearrange the pictures from the received order (sometimes referred to as "display order") into a coding order for coding. Video encoder 200 may generate a bitstream including encoded video data. Source device 102 may then output the encoded video data via output interface 108 onto computer-readable medium 110 for reception and/or retrieval by, e.g., input interface 122 of destination device 116.

Memory 106 of source device 102 and memory 120 of destination device 116 represent general purpose memories. In some examples, memories 106, 120 may store raw video data, e.g., raw video from video source 104 and raw, decoded video data from video decoder 300. Additionally or alternatively, memories 106, 120 may store software instructions executable by, e.g., video encoder 200 and video decoder 300, respectively. Although memories 106, 120 are shown separately from video encoder 200 and video decoder 300 in this example, it should be understood that video encoder 200 and video decoder 300 may also include internal memories for functionally similar or equivalent purposes. Furthermore, memories 106, 120 may store encoded video data, e.g., output from video encoder 200 and input to video decoder 300. In some examples, portions of memories 106, 120 may be allocated as one or more video buffers, e.g., to store raw, decoded, and/or encoded video data.

Computer-readable medium 110 may represent any type of medium or device capable of transporting the encoded video data from source device 102 to destination device 116. In some examples, computer-readable medium 110 represents a communication medium to enable source device 102 to transmit encoded video data directly to destination device 116 in real-time, e.g., via a radio frequency network or computer-based network. Output interface 108 may modulate a transmission signal including the encoded video data, and input interface 122 may modulate the received transmission signal, according to a communication standard, such as a wireless communication protocol. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device 102 to destination device 116.

In some examples, computer-readable medium 110 may include storage device 112. Source device 102 may output encoded data from output interface 108 to storage device 112. Similarly, destination device 116 may access encoded data from storage device 112 via input interface 122. Storage device 112 may include any of a variety of distributed or locally accessed data storage media such as a hard drive, Blu-ray discs, DVDs, CD-ROMs, flash memory, volatile or non-volatile memory, or any other suitable digital storage media for storing encoded video data.

In some examples, computer-readable medium 110 may include file server 114 or another intermediate storage device that may store the encoded video data generated by source device 102. Source device 102 may output encoded video data to file server 114. Destination device 116 may access stored video data from file server 114 via streaming or download. File server 114 may be any type of server device capable of storing encoded video data and transmitting that encoded video data to the destination device 116. File server 114 may represent a web server (e.g., for a website), a File Transfer Protocol (FTP) server, a content delivery network device, or a network attached storage (NAS) device. Destination device 116 may access encoded video data from file server 114 through any standard data connection, including an Internet connection. This may include a wireless channel (e.g., a Wi-Fi connection), a wired connection (e.g., digital subscriber line (DSL), cable modem, etc.), or a combination of both that is suitable for accessing encoded video data stored on file server 114. File server 114 and input interface 122 may be configured to operate according to a streaming transmission protocol, a download transmission protocol, or a combination thereof.

Output interface 108 and input interface 122 may represent wireless transmitters/receivers, modems, wired networking components (e.g., Ethernet cards), wireless communication components that operate according to any of a variety of IEEE 802.11 standards, or other physical components. In examples where output interface 108 and input interface 122 comprise wireless components, output interface 108 and input interface 122 may be configured to transfer data, such as encoded video data, according to a cellular communication standard, such as 4G, 4G-LTE (Long-Term Evolution), LTE Advanced, 5G, or the like. In some examples where output interface 108 comprises a wireless transmitter, output interface 108 and input interface 122 may be configured to transfer data, such as encoded video data, according to other wireless standards, such as an IEEE 802.11 specification, an IEEE 802.15 specification (e.g., ZigBee™), a Bluetooth™ standard, or the like. In some examples, source device 102 and/or destination device 116 may include respective system-on-a-chip (SoC) devices. For example, source device 102 may include an SoC device to perform the functionality attributed to video encoder 200 and/or output interface 108, and destination device 116 may include an SoC device to perform the functionality attributed to video decoder 300 and/or input interface 122.

The techniques of this disclosure may be applied to video coding in support of any of a variety of multimedia applications, such as over-the-air television broadcasts, cable television transmissions, satellite television transmissions, Internet streaming video transmissions, such as dynamic adaptive streaming over HTTP (DASH), digital video that is encoded onto a data storage medium, decoding of digital video stored on a data storage medium, or other applications.

Input interface 122 of destination device 116 receives an encoded video bitstream from computer-readable medium 110 (e.g., a communication medium, storage device 112, file server 114, or the like). The encoded video bitstream from computer-readable medium 110 may include signaling information defined by video encoder 200, which is also used by video decoder 300, such as syntax elements having values that describe characteristics and/or processing of video blocks or other coded units (e.g., slices, pictures, groups of pictures, sequences, or the like). Display device 118 displays decoded pictures of the decoded video data to a user. Display device 118 may represent any of a variety of display devices such as a cathode ray tube (CRT), a liquid crystal display (LCD), a plasma display, an organic light emitting diode (OLED) display, or another type of display device.

Although not shown in FIG. 1, in some examples, video encoder 200 and video decoder 300 may each be integrated with an audio encoder and/or audio decoder, and may include appropriate MUX-DEMUX units, or other hardware and/or software, to handle multiplexed streams including both audio and video in a common data stream. If applicable, MUX-DEMUX units may conform to the ITU H.223 multiplexer protocol, or other protocols such as the user datagram protocol (UDP).

Video encoder 200 and video decoder 300 each may be implemented as any of a variety of suitable encoder and/or decoder circuitry, such as one or more microprocessors, digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a suitable, non-transitory computer-readable medium and execute the instructions in hardware using one or more processors to perform the techniques of this disclosure. Each of video encoder 200 and video decoder 300 may be included in one or more encoders or decoders, either of which may be integrated as part of a combined encoder/decoder (CODEC) in a respective device. A device including video encoder 200 and/or video decoder 300 may comprise an integrated circuit, a microprocessor, and/or a wireless communication device, such as a cellular telephone.

As will be explained in more detail below, video encoder 200 and video decoder 300 may be configured to encode and decode blocks of video data using affine motion prediction. Affine motion prediction is a motion prediction technique that uses models of more complex motion (e.g., rotation, scaling, zoom, etc.) as compared to simple translational motion (e.g., subtracting the (x,y) location of a predictor block from the (x,y) location of the currently coded block). Video encoder 200 and video decoder 300 may use multiple affine motion models in affine motion prediction. For example, a 4-parameter affine motion model may use two motion vectors (called control point motion vectors) determined at two corners of a block. The x and y components of each control point motion vector are parameters in the 4-parameter affine motion model. A 6-parameter affine motion model may use three control point motion vectors at three corners of a block.

Rather than coding the control point motion vectors for each block, video encoder 200 and video decoder 300 may be configured to predict the values of the control point motion vectors from control point motion vectors and/or normal (e.g., translational) motion vectors from neighboring blocks. Such control point motion vectors and/or normal (e.g., translational) motion vectors from neighboring blocks may be referred to as affine motion vector predictors. Video encoder 200 and video decoder 300 may be configured to construct a list of affine motion vector predictors based on some predetermined rules. Video encoder 200 would then instruct video decoder 300 on which affine motion vector predictor in the list to use by signaling an index value into the list.

Affine motion vector predictors may include two example types: inherited affine motion vector predictors and constructed affine motion vector predictors. Inherited affine motion vector predictors are derived from control point motion vectors of a neighboring block. Constructed affine motion vector predictors are derived from normal (e.g., translational) motion vectors of neighboring blocks. As such, inherited affine motion vector predictors came from neighboring blocks coded using affine motion prediction, while constructed affine motion vector predictors come from neighboring blocks coded using normal (e.g., translational) motion prediction (generally, inter prediction).

Video encoder 200 and video decoder 300 may perform affine motion vector prediction in one of several prediction modes, including an advanced motion vector prediction (AMVP) mode and a merge mode. In both affine AMVP mode and affine merge mode, video encoder 200 and video decoder 300 constructs an affine motion vector predictor list. However, the techniques for constructing the list may be different for each mode. In affine AMVP mode, in addition to identifying the affine motion vector predictor from the list that was used, a motion vector difference is also signaled. The motion vector difference is the difference between the value of an actual control point motion vector determined for the current block and the value of the affine motion vector predictor. In affine merge mode, no motion vector difference is sent. Rather, the value of the indicated affine motion vector predictor is used as the control point motion vector for the block.

In some examples, this disclosure describes techniques for constructing an affine motion vector predictor list for affine AMVP mode. In one example, video encoder 200 and video decoder 300 constructs the affine motion vector predictor list using the following techniques. First, video encoder 200 and/or video decoder 300 inserts one or more inherited affine motion vector predictors derived from neighboring candidate blocks, if available. In some examples, there may be no inherited affine motion vector predictors. If the number of existing predictors in the list is less than a predefined maximum number, video encoder 200 and/or video decoder 300 inserts constructed affine motion vector predictors, if available. In some examples, there may be no constructed affine motion vector predictors. If the number of existing predictors in the list is still less than the predefined maximum number, video encoder 200 and/or video decoder 300 inserts the affine motion vector predictors that have all the control point MVs equal to one designated MV. As such, for some example blocks, an affine motion vector predictor list will include one or more inherited affine motion vector predictors and/or one or more constructed affine motion vector predictors along with affine motion vector predictors that have all the control point MVs equal to one designated MV.

In another example of the disclosure, video decoder 300 comprises a memory configured to store a block of video data encoded using affine advanced motion vector prediction (AMVP) mode, and one or more processors in communication with the memory, the one or more processors configured to receive the block of video data, construct an affine AMVP motion vector predictor list of candidate control point motion vectors for the block of video data, the affine AMVP motion vector predictor list including one or more affine motion vector predictors that have all control point motion vectors equal to a designated motion vector, determine control point motion vectors for the block of video data from the affine AMVP motion vector predictor list, and decode the block of video data using the determined control point motion vectors.

In another example of the disclosure, video encoder 200 comprises a memory configured to store a block of video data to be encoded using affine advanced motion vector prediction (AMVP) mode, and one or more processors in communication with the memory, the one or more processors configured to receive the block of video data, construct an affine AMVP motion vector predictor list of candidate control point motion vectors for the block of video data, the affine AMVP motion vector predictor list including one or more affine motion vector predictors that have all control point motion vectors equal to a designated motion vector, determine control point motion vectors for the block of video data from the affine AMVP motion vector predictor list, and encode the block of video data using the determined control point motion vectors.

Video encoder 200 and video decoder 300 may operate according to a video coding standard, such as ITU-T H.265, also referred to as High Efficiency Video Coding (HEVC) or extensions thereto, such as the multi-view and/or scalable video coding extensions. Alternatively, video encoder 200 and video decoder 300 may operate according to other proprietary or industry standards, such as the Joint Exploration Test Model (JEM). Recently, a new video coding standard, referred to as the Versatile Video Coding (VVC) standard, is under development by the Joint Video Expert Team (WET) of the Video Coding Experts Group (VCEG) and the Moving Picture Experts Group (MPEG). An early draft of the VVC is available in the document JVET-J1001 "Versatile Video Coding (Draft 1)" by Benjamin Bross, and its algorithm description is available in the document JVET-J1002 "Algorithm description for Versatile Video Coding and Test Model 1 (VTM 1)" by Jianle Chen and Elena Alshina. The techniques of this disclosure, however, are not limited to any particular coding standard.

In general, video encoder 200 and video decoder 300 may perform block-based coding of pictures. The term "block" generally refers to a structure including data to be processed (e.g., encoded, decoded, or otherwise used in the encoding and/or decoding process). For example, a block may include a two-dimensional matrix of samples of luminance and/or chrominance data. In general, video encoder 200 and video decoder 300 may code video data represented in a YUV (e.g., Y, Cb, Cr) format. That is, rather than coding red, green, and blue (RGB) data for samples of a picture, video encoder 200 and video decoder 300 may code luminance and chrominance components, where the chrominance components may include both red hue and blue hue chrominance components. In some examples, video encoder 200 converts received RGB formatted data to a YUV representation prior to encoding, and video decoder 300 converts the YUV representation to the RGB format. Alternatively, pre- and post-processing units (not shown) may perform these conversions.

This disclosure may generally refer to coding (e.g., encoding and decoding) of pictures to include the process of encoding or decoding data of the picture. Similarly, this disclosure may refer to coding of blocks of a picture to include the process of encoding or decoding data for the blocks, e.g., prediction and/or residual coding. An encoded video bitstream generally includes a series of values for syntax elements representative of coding decisions (e.g., coding modes) and partitioning of pictures into blocks. Thus, references to coding a picture or a block should generally be understood as coding values for syntax elements forming the picture or block.

HEVC defines various blocks, including coding units (CUs), prediction units (PUs), and transform units (TUs). According to HEVC, a video coder (such as video encoder 200) partitions a coding tree unit (CTU) into CUs according to a quadtree structure. That is, the video coder partitions CTUs and CUs into four equal, non-overlapping squares, and each node of the quadtree has either zero or four child nodes. Nodes without child nodes may be referred to as "leaf nodes," and CUs of such leaf nodes may include one or more PUs and/or one or more TUs. The video coder may further partition PUs and TUs. For example, in HEVC, a residual quadtree (RQT) represents partitioning of TUs. In HEVC, PUs represent inter-prediction data, while TUs represent residual data. CUs that are intra-predicted include intra-prediction information, such as an intra-mode indication.

As another example, video encoder 200 and video decoder 300 may be configured to operate according to JEM and/or VVC. According some examples of JEM and VVC, a video coder (such as video encoder 200) partitions a picture into a plurality of coding tree units (CTUs). Video encoder 200 may partition a CTU according to a tree structure, such as a quadtree-binary tree (QTBT) structure. The QTBT structure of JEM removes the concepts of multiple partition types, such as the separation between CUs, PUs, and TUs of HEVC. A QTBT structure of JEM/VVC includes two levels: a first level partitioned according to quadtree partitioning, and a second level partitioned according to binary tree partitioning. A root node of the QTBT structure corresponds to a CTU. Leaf nodes of the binary trees correspond to coding units (CUs).

In some examples, video encoder 200 and video decoder 300 may use a single QTBT structure to represent each of the luminance and chrominance components, while in other examples, video encoder 200 and video decoder 300 may use two or more QTBT structures, such as one QTBT structure for the luminance component and another QTBT structure for both chrominance components (or two QTBT structures for respective chrominance components).

Video encoder 200 and video decoder 300 may be configured to use quadtree partitioning per HEVC, QTBT partitioning according to JEM/VVC, or other partitioning structures. For purposes of explanation, the description of the techniques of this disclosure is presented with respect to QTBT partitioning. However, it should be understood that the techniques of this disclosure may also be applied to video coders configured to use quadtree partitioning, or other types of partitioning as well.

This disclosure may use "N×N" and "N by N" interchangeably to refer to the sample dimensions of a block (such as a CU or other video block) in terms of vertical and horizontal dimensions, e.g., 16×16 samples or 16 by 16 samples. In general, a 16×16 CU will have 16 samples in a vertical direction (y=16) and 16 samples in a horizontal direction (x=16). Likewise, an N×N CU generally has N samples in a vertical direction and N samples in a horizontal direction, where N represents a nonnegative integer value. The samples in a CU may be arranged in rows and columns. Moreover, CUs need not necessarily have the same number of samples in the horizontal direction as in the vertical direction. For example, CUs may comprise N×M samples, where M is not necessarily equal to N.

Video encoder 200 encodes video data for CUs representing prediction and/or residual information, and other information. The prediction information indicates how the CU is to be predicted in order to form a prediction block for the CU. The residual information generally represents sample-by-sample differences between samples of the CU prior to encoding and the prediction block.

To predict a CU, video encoder 200 may generally form a prediction block for the CU through inter-prediction or intra-prediction. Inter-prediction generally refers to predicting the CU from data of a previously coded picture, whereas intra-prediction generally refers to predicting the CU from previously coded data of the same picture. To perform inter-prediction, video encoder 200 may generate the prediction block using one or more motion vectors. Video encoder 200 may generally perform a motion search to identify a reference block that closely matches the CU, e.g., in terms of differences between the CU and the reference block. Video encoder 200 may calculate a difference metric using a sum of absolute difference (SAD), sum of squared differences (SSD), mean absolute difference (MAD), mean squared differences (MSD), or other such difference calculations to determine whether a reference block closely matches the current CU. In some examples, video encoder 200 may predict the current CU using uni-directional prediction or bi-directional prediction.

Examples of JEM and VVC may also provide an affine motion compensation mode, which may be considered an inter-prediction mode. In affine motion compensation mode, video encoder 200 may determine two or more motion vectors that represent non-translational motion, such as zoom in or out, rotation, perspective motion, or other irregular motion types. This disclosure describes techniques related to affine motion prediction in more detail below.

To perform intra-prediction, video encoder 200 may select an intra-prediction mode to generate the prediction block. Examples of JEM and VVC provide sixty-seven intra-prediction modes, including various directional modes, as well as planar mode and DC mode. In general, video encoder 200 selects an intra-prediction mode that describes neighboring samples to a current block (e.g., a block of a CU) from which to predict samples of the current block. Such samples may generally be above, above and to the left, or to the left of the current block in the same picture as the current block, assuming video encoder 200 codes CTUs and CUs in raster scan order (left to right, top to bottom).

Video encoder 200 encodes data representing the prediction mode for a current block. For example, for inter-prediction modes, video encoder 200 may encode data representing which of the various available inter-prediction modes is used, as well as motion information for the corresponding mode. For uni-directional or bi-directional inter-prediction, for example, video encoder 200 may encode motion vectors using advanced motion vector prediction (AMVP) or merge mode. Video encoder 200 may use similar modes to encode motion vectors for affine motion compensation mode.

Following prediction, such as intra-prediction or inter-prediction of a block, video encoder 200 may calculate residual data for the block. The residual data, such as a residual block, represents sample by sample differences between the block and a prediction block for the block, formed using the corresponding prediction mode. Video encoder 200 may apply one or more transforms to the residual block, to produce transformed data in a transform domain instead of the sample domain. For example, video encoder 200 may apply a discrete cosine transform (DCT), an integer transform, a wavelet transform, or a conceptually similar transform to residual video data. Additionally, video encoder 200 may apply a secondary transform following the first transform, such as a mode-dependent non-separable secondary transform (MDNSST), a signal dependent transform, a Karhunen-Loeve transform (KLT), or the like. Video encoder 200 produces transform coefficients following application of the one or more transforms.

As noted above, following any transforms to produce transform coefficients, video encoder 200 may perform quantization of the transform coefficients. Quantization generally refers to a process in which transform coefficients are quantized to possibly reduce the amount of data used to represent the coefficients, providing further compression. By performing the quantization process, video encoder 200 may reduce the bit depth associated with some or all of the coefficients. For example, video encoder 200 may round an n-bit value down to an m-bit value during quantization, where n is greater than m. In some examples, to perform quantization, video encoder 200 may perform a bitwise right-shift of the value to be quantized.

Following quantization, video encoder 200 may scan the transform coefficients, producing a one-dimensional vector from the two-dimensional matrix including the quantized transform coefficients. The scan may be designed to place higher energy (and therefore lower frequency) coefficients at the front of the vector and to place lower energy (and therefore higher frequency) transform coefficients at the back of the vector. In some examples, video encoder 200 may utilize a predefined scan order to scan the quantized transform coefficients to produce a serialized vector, and then entropy encode the quantized transform coefficients of the vector. In other examples, video encoder 200 may perform an adaptive scan. After scanning the quantized transform coefficients to form the one-dimensional vector, video encoder 200 may entropy encode the one-dimensional vector, e.g., according to context-adaptive binary arithmetic coding (CABAC). Video encoder 200 may also entropy encode values for syntax elements describing metadata associated with the encoded video data for use by video decoder 300 in decoding the video data.

To perform CABAC, video encoder 200 may assign a context within a context model to a symbol to be transmitted. The context may relate to, for example, whether neighboring values of the symbol are zero-valued or not. The probability determination may be based on a context assigned to the symbol.

Video encoder 200 may further generate syntax data, such as block-based syntax data, picture-based syntax data, and sequence-based syntax data, to video decoder 300, e.g., in a picture header, a block header, a slice header, or other syntax data, such as a sequence parameter set (SPS), picture parameter set (PPS), or video parameter set (VPS). Video decoder 300 may likewise decode such syntax data to determine how to decode corresponding video data.

In this manner, video encoder 200 may generate a bitstream including encoded video data, e.g., syntax elements describing partitioning of a picture into blocks (e.g., CUs) and prediction and/or residual information for the blocks. Ultimately, video decoder 300 may receive the bitstream and decode the encoded video data.

In general, video decoder 300 performs a reciprocal process to that performed by video encoder 200 to decode the encoded video data of the bitstream. For example, video decoder 300 may decode values for syntax elements of the bitstream using CABAC in a manner substantially similar to, albeit reciprocal to, the CABAC encoding process of video encoder 200. The syntax elements may define partitioning information of a picture into CTUs, and partitioning of each CTU according to a corresponding partition structure, such as a QTBT structure, to define CUs of the CTU. The syntax elements may further define prediction and residual information for blocks (e.g., CUs) of video data.

The residual information may be represented by, for example, quantized transform coefficients. Video decoder 300 may inverse quantize and inverse transform the quantized transform coefficients of a block to reproduce a residual block for the block. Video decoder 300 uses a signaled prediction mode (intra- or inter-prediction) and related prediction information (e.g., motion information for inter-prediction) to form a prediction block for the block. Video decoder 300 may then combine the prediction block and the residual block (on a sample-by-sample basis) to reproduce the original block. Video decoder 300 may perform additional processing, such as performing a deblocking process to reduce visual artifacts along boundaries of the block.

In accordance with the techniques of this disclosure, video encoder 200 and video decoder 300 may be configured to perform any combination of the techniques described below for affine motion prediction.

This disclosure may generally refer to "signaling" certain information, such as syntax elements. The term "signaling" may generally refer to the communication of values for syntax elements and/or other data used to decode encoded video data. That is, video encoder 200 may signal values for syntax elements in the bitstream. In general, signaling refers to generating a value in the bitstream. As noted above, source device 102 may transport the bitstream to destination device 116 substantially in real time, or not in real time, such as might occur when storing syntax elements to storage device 112 for later retrieval by destination device 116.

Figure 2A:
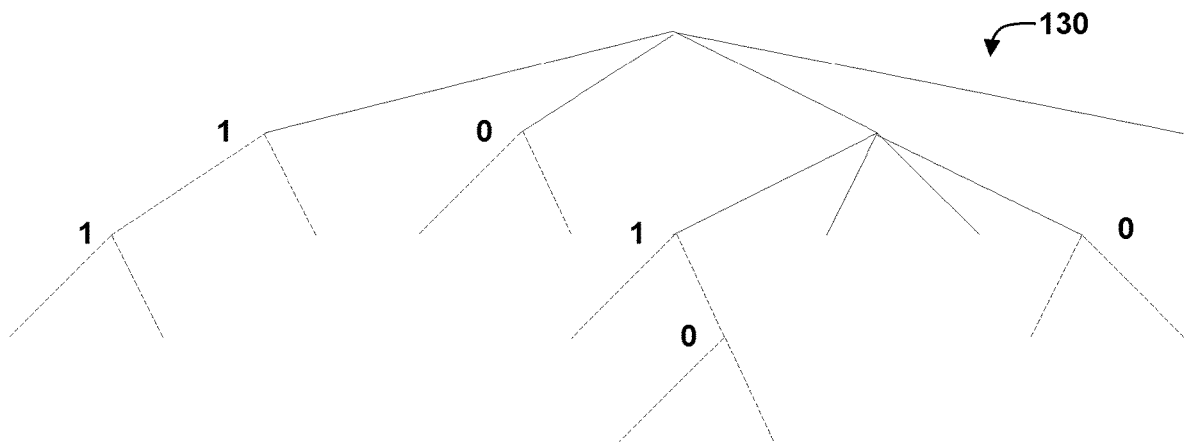
FIGS. 2A and 2B are conceptual diagrams illustrating an example quadtree binary tree (QTBT) structure, and a corresponding coding tree unit (CTU).
Figure 2B:
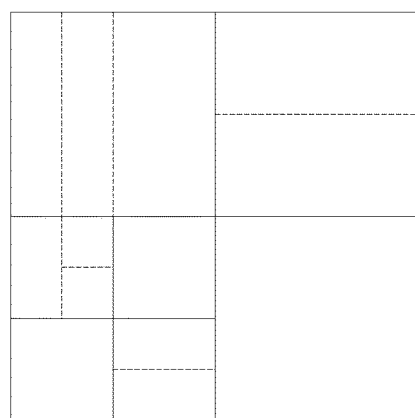

FIGS. 2A and 2B are conceptual diagram illustrating an example quadtree binary tree (QTBT) structure 130, and a corresponding coding tree unit (CTU) 132. The solid lines represent quadtree splitting, and dotted lines indicate binary tree splitting. In each split (i.e., non-leaf) node of the binary tree, one flag is signaled to indicate which splitting type (i.e., horizontal or vertical) is used, where 0 indicates horizontal splitting and 1 indicates vertical splitting in this example. For the quadtree splitting, there is no need to indicate the splitting type, since quadtree nodes split a block horizontally and vertically into 4 sub-blocks with equal size. Accordingly, video encoder 200 may encode, and video decoder 300 may decode, syntax elements (such as splitting information) for a region tree level of QTBT structure 130 (i.e., the solid lines) and syntax elements (such as splitting information) for a prediction tree level of QTBT structure 130 (i.e., the dashed lines). Video encoder 200 may encode, and video decoder 300 may decode, video data, such as prediction and transform data, for CUs represented by terminal leaf nodes of QTBT structure 130.

In general, CTU 132 of FIG. 2B may be associated with parameters defining sizes of blocks corresponding to nodes of QTBT structure 130 at the first and second levels. These parameters may include a CTU size (representing a size of CTU 132 in samples), a minimum quadtree size (MinQTSize, representing a minimum allowed quadtree leaf node size), a maximum binary tree size (MaxBTSize, representing a maximum allowed binary tree root node size), a maximum binary tree depth (MaxBTDepth, representing a maximum allowed binary tree depth), and a minimum binary tree size (MinBTSize, representing the minimum allowed binary tree leaf node size).

The root node of a QTBT structure corresponding to a CTU may have four child nodes at the first level of the QTBT structure, each of which may be partitioned according to quadtree partitioning. That is, nodes of the first level are either leaf nodes (having no child nodes) or have four child nodes. The example of QTBT structure 130 represents such nodes as including the parent node and child nodes having solid lines for branches. If nodes of the first level are not larger than the maximum allowed binary tree root node size (MaxBTSize), they can be further partitioned by respective binary trees. The binary tree splitting of one node can be iterated until the nodes resulting from the split reach the minimum allowed binary tree leaf node size (MinBTSize) or the maximum allowed binary tree depth (MaxBTDepth). The example of QTBT structure 130 represents such nodes as having dashed lines for branches. The binary tree leaf node is referred to as a coding unit (CU), which is used for prediction (e.g., intra-picture or inter-picture prediction) and transform, without any further partitioning. As discussed above, CUs may also be referred to as "video blocks" or "blocks."

In some examples of the QTBT partitioning structure, the CTU size is set as 128×128 (luma samples and two corresponding 64×64 chroma samples), the MinQTSize is set as 16×16, the MaxBTSize is set as 64×64, the MinBTSize (for both width and height) is set as 4, and the MaxBTDepth is set as 4. The quadtree partitioning is applied to the CTU first to generate quad-tree leaf nodes. The quadtree leaf nodes may have a size from 16×16 (i.e., the MinQTSize) to 128×128 (i.e., the CTU size). If the leaf quadtree node is 128×128, the leaf quadtree node will not be further split by the binary tree, since the size exceeds the MaxBTSize (i.e., 64×64, in this example). Otherwise, the leaf quadtree node will be further partitioned by the binary tree. Therefore, the quadtree leaf node is also the root node for the binary tree and has the binary tree depth as 0. When the binary tree depth reaches MaxBTDepth (4, in this example), no further splitting is permitted. When the binary tree node has width equal to MinBTSize (4, in this example), the binary tree node implies no further horizontal splitting is permitted. Similarly, a binary tree node having a height equal to MinBTSize implies no further vertical splitting is permitted for that binary tree node. As noted above, leaf nodes of the binary tree are referred to as CUs, and are further processed according to prediction and transform without further partitioning.

Figure 3:
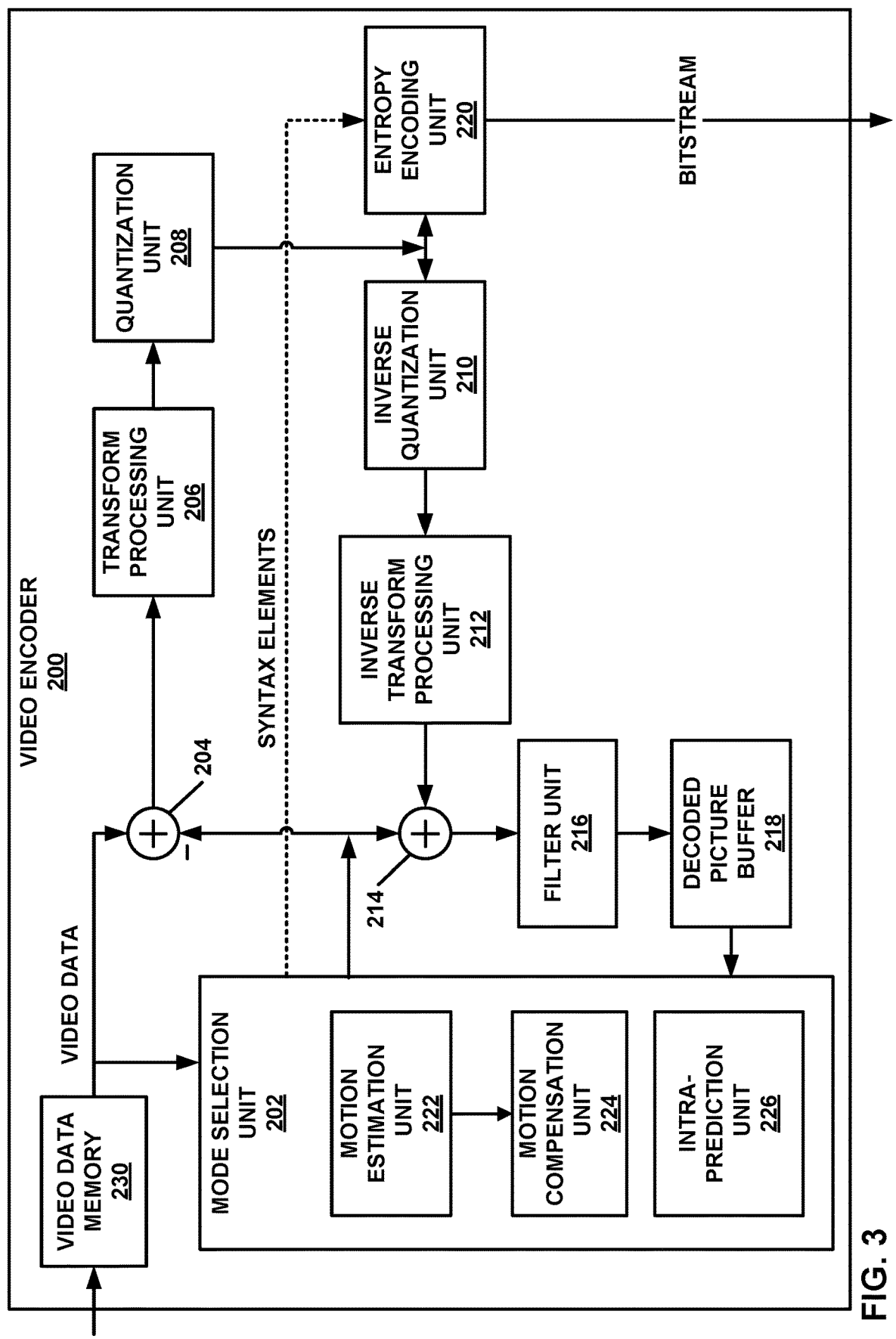
FIG. 3 is a block diagram illustrating an example video encoder that may perform the techniques of this disclosure.

FIG. 3 is a block diagram illustrating an example video encoder 200 that may perform the techniques of this disclosure. FIG. 3 is provided for purposes of explanation and should not be considered limiting of the techniques as broadly exemplified and described in this disclosure. For purposes of explanation, this disclosure describes video encoder 200 in the context of video coding standards such as the HEVC video coding standard and the H.266 video coding standard (VVC) in development. However, the techniques of this disclosure are not limited to these video coding standards, and are applicable generally to video encoding and decoding.

In the example of FIG. 3, video encoder 200 includes video data memory 230, mode selection unit 202, residual generation unit 204, transform processing unit 206, quantization unit 208, inverse quantization unit 210, inverse transform processing unit 212, reconstruction unit 214, filter unit 216, decoded picture buffer (DPB) 218, and entropy encoding unit 220.

Video data memory 230 may store video data to be encoded by the components of video encoder 200. Video encoder 200 may receive the video data stored in video data memory 230 from, for example, video source 104 (FIG. 1). DPB 218 may act as a reference picture memory that stores reference video data for use in prediction of subsequent video data by video encoder 200. Video data memory 230 and DPB 218 may be formed by any of a variety of memory devices, such as dynamic random access memory (DRAM), including synchronous DRAM (SDRAM), magnetoresistive RAM (MRAM), resistive RAM (RRAM), or other types of memory devices. Video data memory 230 and DPB 218 may be provided by the same memory device or separate memory devices. In various examples, video data memory 230 may be on-chip with other components of video encoder 200, as illustrated, or off-chip relative to those components.

In this disclosure, reference to video data memory 230 should not be interpreted as being limited to memory internal to video encoder 200, unless specifically described as such, or memory external to video encoder 200, unless specifically described as such. Rather, reference to video data memory 230 should be understood as reference memory that stores video data that video encoder 200 receives for encoding (e.g., video data for a current block that is to be encoded). Memory 106 of FIG. 1 may also provide temporary storage of outputs from the various units of video encoder 200.

The various units of FIG. 3 are illustrated to assist with understanding the operations performed by video encoder 200. The units may be implemented as fixed-function circuits, programmable circuits, or a combination thereof. Fixed-function circuits refer to circuits that provide particular functionality, and are preset on the operations that can be performed. Programmable circuits refer to circuits that can programmed to perform various tasks, and provide flexible functionality in the operations that can be performed. For instance, programmable circuits may execute software or firmware that cause the programmable circuits to operate in the manner defined by instructions of the software or firmware. Fixed-function circuits may execute software instructions (e.g., to receive parameters or output parameters), but the types of operations that the fixed-function circuits perform are generally immutable. In some examples, the one or more of the units may be distinct circuit blocks (fixed-function or programmable), and in some examples, the one or more units may be integrated circuits.

Video encoder 200 may include arithmetic logic units (ALUs), elementary function units (EFUs), digital circuits, analog circuits, and/or programmable cores, formed from programmable circuits. In examples where the operations of video encoder 200 are performed using software executed by the programmable circuits, memory 106 (FIG. 1) may store instructions (e.g., object code) of the software that video encoder 200 receives and executes, or another memory within video encoder 200 (not shown) may store such instructions.

Video data memory 230 is configured to store received video data. Video encoder 200 may retrieve a picture of the video data from video data memory 230 and provide the video data to residual generation unit 204 and mode selection unit 202. Video data in video data memory 230 may be raw video data that is to be encoded.

Mode selection unit 202 includes a motion estimation unit 222, motion compensation unit 224, and an intra-prediction unit 226. Mode selection unit 202 may include additional functional units to perform video prediction in accordance with other prediction modes. As examples, mode selection unit 202 may include a palette unit, an intra-block copy unit (which may be part of motion estimation unit 222 and/or motion compensation unit 224), an affine unit, a linear model (LM) unit, or the like.

Mode selection unit 202 generally coordinates multiple encoding passes to test combinations of encoding parameters and resulting rate-distortion values for such combinations. The encoding parameters may include partitioning of CTUs into CUs, prediction modes for the CUs, transform types for residual data of the CUs, quantization parameters for residual data of the CUs, and so on. Mode selection unit 202 may ultimately select the combination of encoding parameters having rate-distortion values that are better than the other tested combinations.

Video encoder 200 may partition a picture retrieved from video data memory 230 into a series of CTUs, and encapsulate one or more CTUs within a slice. Mode selection unit 202 may partition a CTU of the picture in accordance with a tree structure, such as the QTBT structure or the quad-tree structure of HEVC described above. As described above, video encoder 200 may form one or more CUs from partitioning a CTU according to the tree structure. Such a CU may also be referred to generally as a "video block" or "block."

In general, mode selection unit 202 also controls the components thereof (e.g., motion estimation unit 222, motion compensation unit 224, and intra-prediction unit 226) to generate a prediction block for a current block (e.g., a current CU, or in HEVC, the overlapping portion of a PU and a TU). For inter-prediction of a current block, motion estimation unit 222 may perform a motion search to identify one or more closely matching reference blocks in one or more reference pictures (e.g., one or more previously coded pictures stored in DPB 218). In particular, motion estimation unit 222 may calculate a value representative of how similar a potential reference block is to the current block, e.g., according to sum of absolute difference (SAD), sum of squared differences (SSD), mean absolute difference (MAD), mean squared differences (MSD), or the like. Motion estimation unit 222 may generally perform these calculations using sample-by-sample differences between the current block and the reference block being considered. Motion estimation unit 222 may identify a reference block having a lowest value resulting from these calculations, indicating a reference block that most closely matches the current block.

Motion estimation unit 222 may form one or more motion vectors (MVs) that defines the positions of the reference blocks in the reference pictures relative to the position of the current block in a current picture. Motion estimation unit 222 may then provide the motion vectors to motion compensation unit 224. For example, for uni-directional inter-prediction, motion estimation unit 222 may provide a single motion vector, whereas for bi-directional inter-prediction, motion estimation unit 222 may provide two motion vectors. Motion compensation unit 224 may then generate a prediction block using the motion vectors. For example, motion compensation unit 224 may retrieve data of the reference block using the motion vector. As another example, if the motion vector has fractional sample precision, motion compensation unit 224 may interpolate values for the prediction block according to one or more interpolation filters. Moreover, for bi-directional inter-prediction, motion compensation unit 224 may retrieve data for two reference blocks identified by respective motion vectors and combine the retrieved data, e.g., through sample-by-sample averaging or weighted averaging.

In accordance with the techniques of this disclosure, motion estimation unit 222 and motion compensation unit 224 may be configured to perform any combination of the techniques described below for affine motion prediction. For example, as will be explained in more detail below, motion estimation unit 22 and motion compensation unit 224 may be configured to receive a block of video data to be encoded using affine advanced motion vector prediction (AMVP) mode, construct an affine AMVP motion vector predictor list of candidate control point motion vectors for the block of video data, the affine AMVP motion vector predictor list including one or more affine motion vector predictors that have all control point motion vectors equal to a designated motion vector, determine control point motion vectors for the block of video data from the affine AMVP motion vector predictor list, and encode the block of video data using the determined control point motion vectors.

As another example, for intra-prediction, or intra-prediction coding, intra-prediction unit 226 may generate the prediction block from samples neighboring the current block. For example, for directional modes, intra-prediction unit 226 may generally mathematically combine values of neighboring samples and populate these calculated values in the defined direction across the current block to produce the prediction block. As another example, for DC mode, intra-prediction unit 226 may calculate an average of the neighboring samples to the current block and generate the prediction block to include this resulting average for each sample of the prediction block.

Mode selection unit 202 provides the prediction block to residual generation unit 204. Residual generation unit 204 receives a raw, uncoded version of the current block from video data memory 230 and the prediction block from mode selection unit 202. Residual generation unit 204 calculates sample-by-sample differences between the current block and the prediction block. The resulting sample-by-sample differences define a residual block for the current block. In some examples, residual generation unit 204 may also determine differences between sample values in the residual block to generate a residual block using residual differential pulse code modulation (RDPCM). In some examples, residual generation unit 204 may be formed using one or more subtractor circuits that perform binary subtraction.

In examples where mode selection unit 202 partitions CUs into PUs, each PU may be associated with a luma prediction unit and corresponding chroma prediction units. Video encoder 200 and video decoder 300 may support PUs having various sizes. As indicated above, the size of a CU may refer to the size of the luma coding block of the CU and the size of a PU may refer to the size of a luma prediction unit of the PU. Assuming that the size of a particular CU is 2N×2N, video encoder 200 may support PU sizes of 2N×2N or N×N for intra prediction, and symmetric PU sizes of 2N×2N, 2N×N, N×2N, N×N, or similar for inter prediction. Video encoder 20 and video decoder 30 may also support asymmetric partitioning for PU sizes of 2N×nU, 2N×nD, nL×2N, and nR×2N for inter prediction.

In examples where mode selection unit does not further partition a CU into PUs, each CU may be associated with a luma coding block and corresponding chroma coding blocks. As above, the size of a CU may refer to the size of the luma coding block of the CU. The video encoder 200 and video decoder 300 may support CU sizes of 2N×2N, 2N×N, or N×2N.

For other video coding techniques such as an intra-block copy mode coding, an affine-mode coding, and linear model (LM) mode coding, as a few examples, mode selection unit 202, via respective units associated with the coding techniques, generates a prediction block for the current block being encoded. In some examples, such as palette mode coding, mode selection unit 202 may not generate a prediction block, and instead generate syntax elements that indicate the manner in which to reconstruct the block based on a selected palette. In such modes, mode selection unit 202 may provide these syntax elements to entropy encoding unit 220 to be encoded.

As described above, residual generation unit 204 receives the video data for the current block and the corresponding prediction block. Residual generation unit 204 then generates a residual block for the current block. To generate the residual block, residual generation unit 204 calculates sample-by-sample differences between the prediction block and the current block.

Transform processing unit 206 applies one or more transforms to the residual block to generate a block of transform coefficients (referred to herein as a "transform coefficient block"). Transform processing unit 206 may apply various transforms to a residual block to form the transform coefficient block. For example, transform processing unit 206 may apply a discrete cosine transform (DCT), a directional transform, a Karhunen-Loeve transform (KLT), or a conceptually similar transform to a residual block. In some examples, transform processing unit 206 may perform multiple transforms to a residual block, e.g., a primary transform and a secondary transform, such as a rotational transform. In some examples, transform processing unit 206 does not apply transforms to a residual block.

Quantization unit 208 may quantize the transform coefficients in a transform coefficient block, to produce a quantized transform coefficient block. Quantization unit 208 may quantize transform coefficients of a transform coefficient block according to a quantization parameter (QP) value associated with the current block. Video encoder 200 (e.g., via mode selection unit 202) may adjust the degree of quantization applied to the transform coefficient blocks associated with the current block by adjusting the QP value associated with the CU. Quantization may introduce loss of information, and thus, quantized transform coefficients may have lower precision than the original transform coefficients produced by transform processing unit 206.

Inverse quantization unit 210 and inverse transform processing unit 212 may apply inverse quantization and inverse transforms to a quantized transform coefficient block, respectively, to reconstruct a residual block from the transform coefficient block. Reconstruction unit 214 may produce a reconstructed block corresponding to the current block (albeit potentially with some degree of distortion) based on the reconstructed residual block and a prediction block generated by mode selection unit 202. For example, reconstruction unit 214 may add samples of the reconstructed residual block to corresponding samples from the prediction block generated by mode selection unit 202 to produce the reconstructed block.

Filter unit 216 may perform one or more filter operations on reconstructed blocks. For example, filter unit 216 may perform deblocking operations to reduce blockiness artifacts along edges of CUs. Operations of filter unit 216 may be skipped, in some examples.

Video encoder 200 stores reconstructed blocks in DPB 218. For instance, in examples where operations of filter unit 216 are not needed, reconstruction unit 214 may store reconstructed blocks to DPB 218. In examples where operations of filter unit 216 are needed, filter unit 216 may store the filtered reconstructed blocks to DPB 218. Motion estimation unit 222 and motion compensation unit 224 may retrieve a reference picture from DPB 218, formed from the reconstructed (and potentially filtered) blocks, to inter-predict blocks of subsequently encoded pictures. In addition, intra-prediction unit 226 may use reconstructed blocks in DPB 218 of a current picture to intra-predict other blocks in the current picture.

In general, entropy encoding unit 220 may entropy encode syntax elements received from other functional components of video encoder 200. For example, entropy encoding unit 220 may entropy encode quantized transform coefficient blocks from quantization unit 208. As another example, entropy encoding unit 220 may entropy encode prediction syntax elements (e.g., motion information for inter-prediction or intra-mode information for intra-prediction) from mode selection unit 202. Entropy encoding unit 220 may perform one or more entropy encoding operations on the syntax elements, which are another example of video data, to generate entropy-encoded data. For example, entropy encoding unit 220 may perform a context-adaptive variable length coding (CAVLC) operation, a CABAC operation, a variable-to-variable (V2V) length coding operation, a syntax-based context-adaptive binary arithmetic coding (SBAC) operation, a Probability Interval Partitioning Entropy (PIPE) coding operation, an Exponential-Golomb encoding operation, or another type of entropy encoding operation on the data. In some examples, entropy encoding unit 220 may operate in bypass mode where syntax elements are not entropy encoded.

Video encoder 200 may output a bitstream that includes the entropy encoded syntax elements needed to reconstruct blocks of a slice or picture. In particular, entropy encoding unit 220 may output the bitstream The operations described above are described with respect to a block. Such description should be understood as being operations for a luma coding block and/or chroma coding blocks. As described above, in some examples, the luma coding block and chroma coding blocks are luma and chroma components of a CU. In some examples, the luma coding block and the chroma coding blocks are luma and chroma components of a PU.

In some examples, operations performed with respect to a luma coding block need not be repeated for the chroma coding blocks. As one example, operations to identify a motion vector (MV) and reference picture for a luma coding block need not be repeated for identifying a MV and reference picture for the chroma blocks. Rather, the MV for the luma coding block may be scaled to determine the MV for the chroma blocks, and the reference picture may be the same. As another example, the intra-prediction process may be the same for the luma coding blocks and the chroma coding blocks.

Video encoder 200 represents an example of a device configured to encode video data including a memory configured to store video data, and one or more processing units implemented in circuitry and configured to perform any combination of the techniques described below for affine motion prediction. As one example, video encoder 200 may be configured to receive a block of video data to be encoded using affine advanced motion vector prediction (AMVP) mode, construct an affine AMVP motion vector predictor list of candidate control point motion vectors for the block of video data, the affine AMVP motion vector predictor list including one or more affine motion vector predictors that have all control point motion vectors equal to a designated motion vector, determine control point motion vectors for the block of video data from the affine AMVP motion vector predictor list, and encode the block of video data using the determined control point motion vectors.

Figure 4:
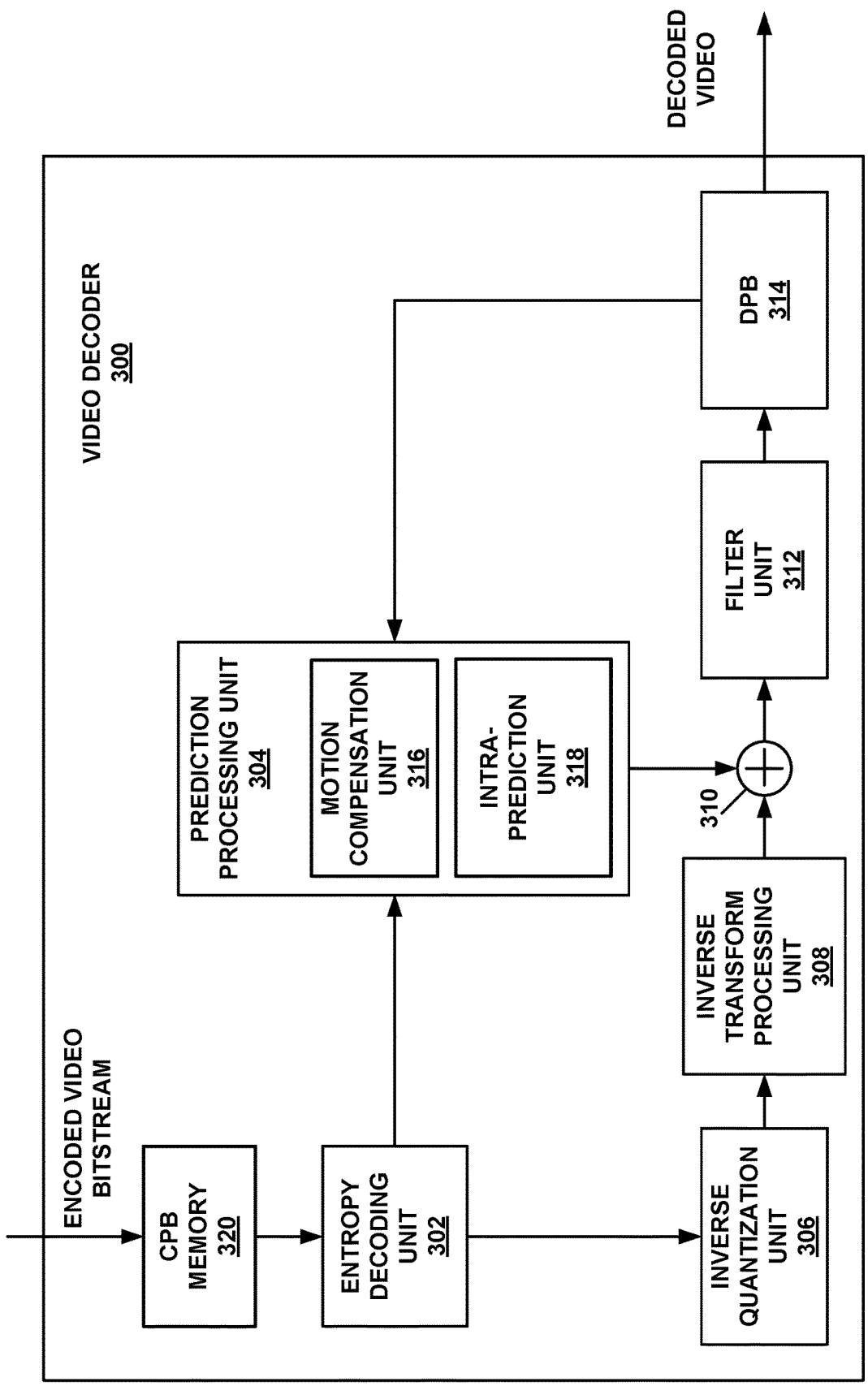
FIG. 4 is a block diagram illustrating an example video decoder that may perform the techniques of this disclosure.

FIG. 4 is a block diagram illustrating an example video decoder 300 that may perform the techniques of this disclosure. FIG. 4 is provided for purposes of explanation and is not limiting on the techniques as broadly exemplified and described in this disclosure. For purposes of explanation, this disclosure describes video decoder 300 according to the techniques of JEM/VVC and HEVC. However, the techniques of this disclosure may be performed by video coding devices that are configured to other video coding standards.

In the example of FIG. 4, video decoder 300 includes coded picture buffer (CPB) memory 320, entropy decoding unit 302, prediction processing unit 304, inverse quantization unit 306, inverse transform processing unit 308, reconstruction unit 310, filter unit 312, and decoded picture buffer (DPB) 314. Prediction processing unit 304 includes motion compensation unit 316 and intra-prediction unit 318. Prediction processing unit 304 may include additional units to perform prediction in accordance with other prediction modes. As examples, prediction processing unit 304 may include a palette unit, an intra-block copy unit (which may form part of motion compensation unit 316), an affine unit, a linear model (LM) unit, or the like. In other examples, video decoder 300 may include more, fewer, or different functional components.

CPB memory 320 may store video data, such as an encoded video bitstream, to be decoded by the components of video decoder 300. The video data stored in CPB memory 320 may be obtained, for example, from computer-readable medium 110 (FIG. 1). CPB memory 320 may include a CPB that stores encoded video data (e.g., syntax elements) from an encoded video bitstream. Also, CPB memory 320 may store video data other than syntax elements of a coded picture, such as temporary data representing outputs from the various units of video decoder 300. DPB 314 generally stores decoded pictures, which video decoder 300 may output and/or use as reference video data when decoding subsequent data or pictures of the encoded video bitstream. CPB memory 320 and DPB 314 may be formed by any of a variety of memory devices, such as dynamic random access memory (DRAM), including synchronous DRAM (SDRAM), magnetoresistive RAM (MRAM), resistive RAM (RRAM), or other types of memory devices. CPB memory 320 and DPB 314 may be provided by the same memory device or separate memory devices. In various examples, CPB memory 320 may be on-chip with other components of video decoder 300, or off-chip relative to those components.

Additionally or alternatively, in some examples, video decoder 300 may retrieve coded video data from memory 120 (FIG. 1). That is, memory 120 may store data as discussed above with CPB memory 320. Likewise, memory 120 may store instructions to be executed by video decoder 300, when some or all of the functionality of video decoder 300 is implemented in software to be executed by processing circuitry of video decoder 300.

The various units shown in FIG. 4 are illustrated to assist with understanding the operations performed by video decoder 300. The units may be implemented as fixed-function circuits, programmable circuits, or a combination thereof. Similar to FIG. 3, fixed-function circuits refer to circuits that provide particular functionality, and are preset on the operations that can be performed. Programmable circuits refer to circuits that can be programmed to perform various tasks, and provide flexible functionality in the operations that can be performed. For instance, programmable circuits may execute software or firmware that cause the programmable circuits to operate in the manner defined by instructions of the software or firmware. Fixed-function circuits may execute software instructions (e.g., to receive parameters or output parameters), but the types of operations that the fixed-function circuits perform are generally immutable. In some examples, the one or more of the units may be distinct circuit blocks (fixed-function or programmable), and in some examples, the one or more units may be integrated circuits.

Video decoder 300 may include ALUs, EFUs, digital circuits, analog circuits, and/or programmable cores formed from programmable circuits. In examples where the operations of video decoder 300 are performed by software executing on the programmable circuits, on-chip or off-chip memory may store instructions (e.g., object code) of the software that video decoder 300 receives and executes.

Entropy decoding unit 302 may receive encoded video data from the CPB and entropy decode the video data to reproduce syntax elements. Prediction processing unit 304, inverse quantization unit 306, inverse transform processing unit 308, reconstruction unit 310, and filter unit 312 may generate decoded video data based on the syntax elements extracted from the bitstream.

In general, video decoder 300 reconstructs a picture on a block-by-block basis. Video decoder 300 may perform a reconstruction operation on each block individually (where the block currently being reconstructed, i.e., decoded, may be referred to as a "current block").

Entropy decoding unit 302 may entropy decode syntax elements defining quantized transform coefficients of a quantized transform coefficient block, as well as transform information, such as a quantization parameter (QP) and/or transform mode indication(s). Inverse quantization unit 306 may use the QP associated with the quantized transform coefficient block to determine a degree of quantization and, likewise, a degree of inverse quantization for inverse quantization unit 306 to apply. Inverse quantization unit 306 may, for example, perform a bitwise left-shift operation to inverse quantize the quantized transform coefficients. Inverse quantization unit 306 may thereby form a transform coefficient block including transform coefficients.

After inverse quantization unit 306 forms the transform coefficient block, inverse transform processing unit 308 may apply one or more inverse transforms to the transform coefficient block to generate a residual block associated with the current block. For example, inverse transform processing unit 308 may apply an inverse DCT, an inverse integer transform, an inverse Karhunen-Loeve transform (KLT), an inverse rotational transform, an inverse directional transform, or another inverse transform to the transform coefficient block.

Furthermore, prediction processing unit 304 generates a prediction block according to prediction information syntax elements that were entropy decoded by entropy decoding unit 302. For example, if the prediction information syntax elements indicate that the current block is inter-predicted, motion compensation unit 316 may generate the prediction block. In this case, the prediction information syntax elements may indicate a reference picture in DPB 314 from which to retrieve a reference block, as well as a motion vector identifying a location of the reference block in the reference picture relative to the location of the current block in the current picture. Motion compensation unit 316 may generally perform the inter-prediction process in a manner that is substantially similar to that described with respect to motion compensation unit 224 (FIG. 3). In accordance with the techniques of this disclosure, motion compensation unit 316 may be configured to perform any combination of the techniques described below for affine motion prediction. For example, motion compensation unit 316 may be configured to receive a block of video data encoded using affine advanced motion vector prediction (AMVP) mode, construct an affine AMVP motion vector predictor list of candidate control point motion vectors for the block of video data, the affine AMVP motion vector predictor list including one or more affine motion vector predictors that have all control point motion vectors equal to a designated motion vector, determine control point motion vectors for the block of video data from the affine AMVP motion vector predictor list, and decode the block of video data using the determined control point motion vectors.

As another example, if the prediction information syntax elements indicate that the current block is intra-predicted, intra-prediction unit 318 may generate the prediction block according to an intra-prediction mode indicated by the prediction information syntax elements. Again, intra-prediction unit 318 may generally perform the intra-prediction process in a manner that is substantially similar to that described with respect to intra-prediction unit 226 (FIG. 3). Intra-prediction unit 318 may retrieve data of neighboring samples to the current block from DPB 314.

Reconstruction unit 310 may reconstruct the current block using the prediction block and the residual block. For example, reconstruction unit 310 may add samples of the residual block to corresponding samples of the prediction block to reconstruct the current block.

Filter unit 312 may perform one or more filter operations on reconstructed blocks. For example, filter unit 312 may perform deblocking operations to reduce blockiness artifacts along edges of the reconstructed blocks. Operations of filter unit 312 are not necessarily performed in all examples.

Video decoder 300 may store the reconstructed blocks in DPB 314. As discussed above, DPB 314 may provide reference information, such as samples of a current picture for intra-prediction and previously decoded pictures for subsequent motion compensation, to prediction processing unit 304. Moreover, video decoder 300 may output decoded pictures from DPB 314 for subsequent presentation on a display device, such as display device 118 of FIG. 1.

In this manner, video decoder 300 represents an example of a video decoding device including a memory configured to store video data, and one or more processing units implemented in circuitry and configured to perform any combination of the techniques described below for affine motion prediction. As will be explained in more detail below, video decoder 300 may be configured to receive a block of video data encoded using affine advanced motion vector prediction (AMVP) mode, construct an affine AMVP motion vector predictor list of candidate control point motion vectors for the block of video data, the affine AMVP motion vector predictor list including one or more affine motion vector predictors that have all control point motion vectors equal to a designated motion vector, determine control point motion vectors for the block of video data from the affine AMVP motion vector predictor list, and decode the block of video data using the determined control point motion vectors.

Figure 5:
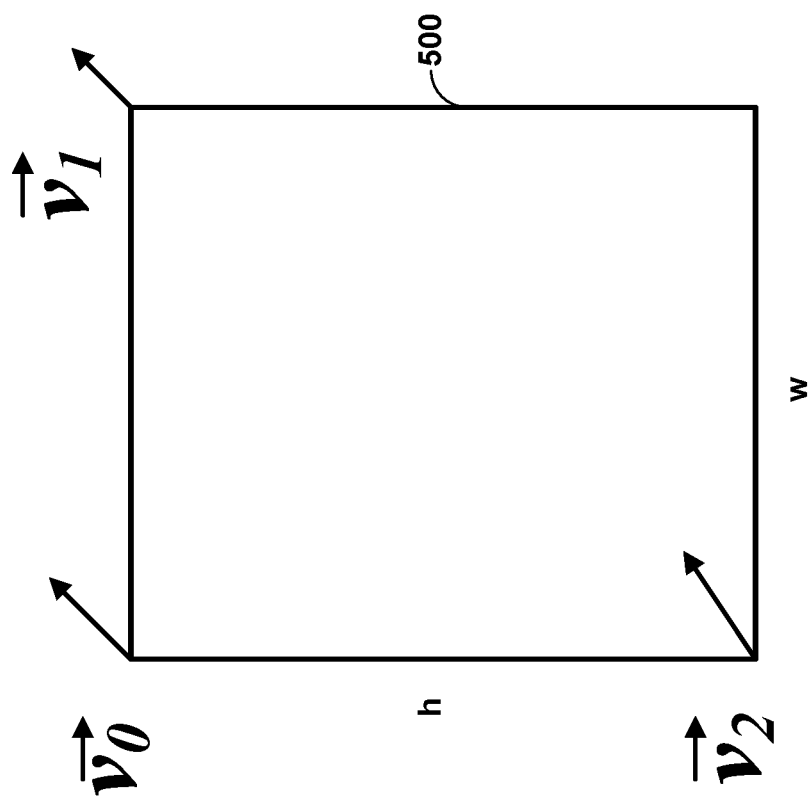
FIG. 5 is a conceptual diagram illustrating example motion vectors for a 6-parameter affine motion model.

Affine motion models will be described in this section. An affine motion model may be described as:

$$\begin{cases} v_x = ax + by + e \\ v_y = cx + dy + f \end{cases} \quad (1)$$

where $(v_x, v_y)$ is the motion vector at the coordinate $(x, y)$, and a, b, c, d, e, and f are the six parameters of the affine motion model. The affine motion model for a block can also be described by the three motion vectors (also called control point motion vectors) $\vec{v}_0=(v_{0x}, v_{0y})$, $\vec{v}_1=(v_{1x}, v_{1y})$, and $\vec{v}_2=(v_{2x}, v_{2y})$ at the three corners of block 500, as shown in FIG. 5. The motion field is then described as:

$$\begin{cases} v_x = \frac{(v_{1x} - v_{0x})}{w}x + \frac{(v_{2x} - v_{0x})}{h}y + v_{0x} \\ v_y = \frac{(v_{1y} - v_{0y})}{w}x + \frac{(v_{2y} - v_{0y})}{h}y + v_{0y} \end{cases} \quad (2)$$

where w and h are the width and height of block 500. The above affine motion model may be referred to as a 6-parameter affine motion model.

A simplified 4-parameter affine motion model is described as:

$$\begin{cases} v_x = ax - by + e \\ v_y = bx + ay + f \end{cases} \quad (3)$$

Figure 6:
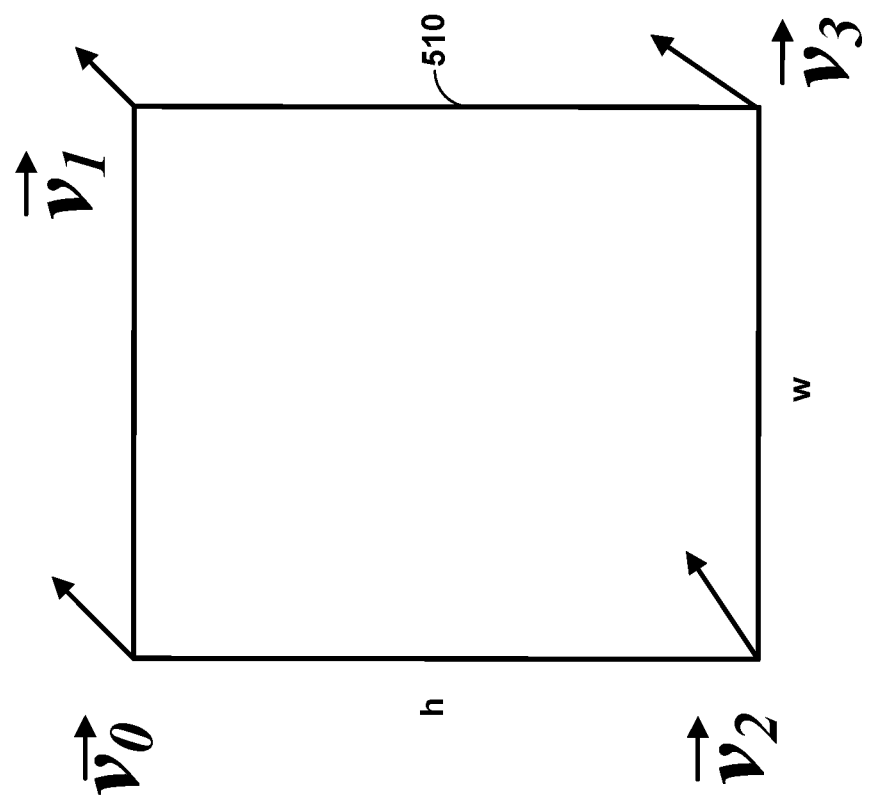
FIG. 6 is a conceptual diagram illustrating example motion vectors for a simplified 4-parameter affine motion model.
Figure 7:
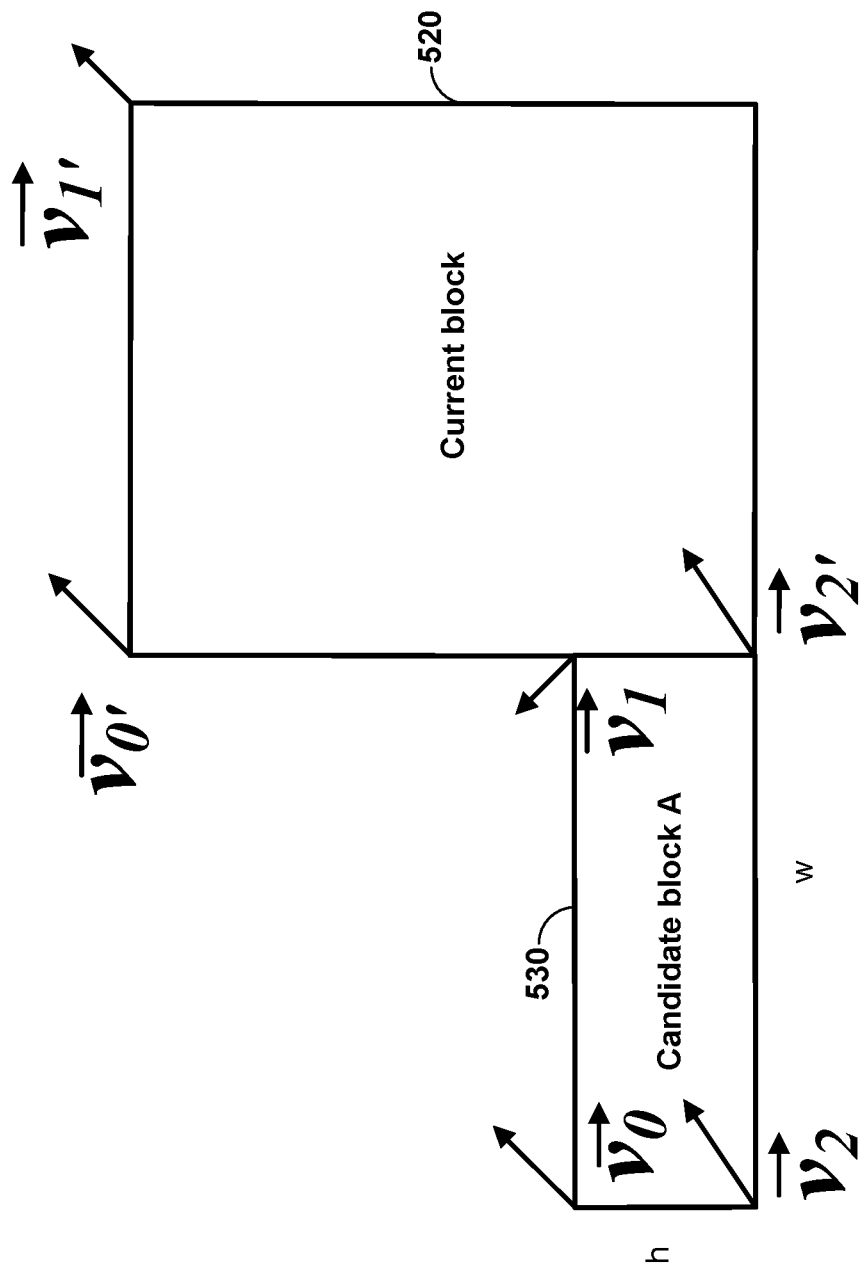
FIG. 7 is a conceptual diagram illustrating an example inherited affine motion vector predictor.

Similarly, the simplified 4-parameter affine motion model for a block can be described by two control point motion vectors $\vec{v}_0=(v_{0x}, v_{0y})$ and $\vec{v}_1=(v_{1x}, v_{1y})$ at the two corners of block 510, as shown in FIG. 6. The motion field is then described as:

$$\begin{cases} v_x = \frac{(v_{1x} - v_{0x})}{w}x - \frac{(v_{1y} - v_{0y})}{h}y + v_{0x} \\ v_y = \frac{(v_{1y} - v_{0y})}{w}x + \frac{(v_{1x} - v_{0x})}{h}y + v_{0y} \end{cases} \quad (4)$$

Techniques for other control point motion vector selection techniques will now be described. The control points motion vectors are not necessarily the same as in FIG. 5 or FIG. 6. Other control point motion vector selection techniques may also be used. For a 4-parameter affine motion model, video encoder 200 and/or video decoder 300 may be configured to determine the control point pairs from any two of the control point motion vectors $\{\vec{v}_0, \vec{v}_1, \vec{v}_2, \vec{v}_3\}$, as shown in FIG. 6. For a 6-parameter affine motion model, video encoder 200 and/or video decoder 300 may be configured to select the control point pairs from any three of the control point motion vectors. Given the selected control point motion vectors, video encoder 200 and/or video decoder 300 may be configured to calculate the other motion vector by the derived affine motion model.

As in the motion vector prediction techniques in HEVC, affine motion predictors can be derived from the affine motion vectors or normal (e.g., translational) motion vectors of the neighboring coded blocks. Two example types of affine motion predictors include inherited affine motion vector predictors and constructed affine motion vector predictors.

To determine inherited affine motion vector predictors, video encoder 200 and/or video decoder 300 use the affine motion model of a candidate block to derive the predicted motion vectors at the control points of a current block. It is assumed that the current block shares the same affine motion model as the candidate block. An example is shown in FIG.

7 for current block 520. The affine motion vectors of the candidate block A 530 (represented as the motion vectors at the control-points) are: $\vec{v}_0=(v_{0x}, v_{0y})$, $\vec{v}_1=(v_{1x}, v_{1y})$, $\vec{v}_2=(v_{2x}, v_{2y})$, the size of candidate block A 530 is (w, h), and the coordinates of control points of the candidate block A 530 are (x0, y0), (x1, y1), and (x2, y2). Video encoder 200 and/or video decoder 300 may be configured to derive the predicted affine motion vectors $\vec{v}'_0=(v_{0x}', v_{0y}')$, $\vec{v}'_1=(v_{1x}', v_{1y}')$, $\vec{v}'_2=(v_{2x}', v_{2y}')$ at the control points of current block 520 by replacing (x,y) in equation (2) with the coordinate difference between the control points of current block 520 and the top-left control point of candidate block A 530:

$$\begin{cases} v'_{0x} = \frac{(v_{1x}-v_{0x})}{w}(x0'-x0) + \frac{(v_{2x}-v_{0x})}{h}(y0'-y0) + v_{0x} \\ v'_{0y} = \frac{(v_{1y}-v_{0y})}{w}(x0'-x0) + \frac{(v_{2y}-v_{0y})}{h}(y0'-y0) + v_{0y} \end{cases} \quad (5)$$

$$\begin{cases} v'_{1x} = \frac{(v_{1x}-v_{0x})}{w}(x1'-x0) + \frac{(v_{2x}-v_{0x})}{h}(y1'-y0) + v_{0x} \\ v'_{1y} = \frac{(v_{1y}-v_{0y})}{w}(x1'-x0) + \frac{(v_{2y}-v_{0y})}{h}(y1'-y0) + v_{0y} \end{cases} \quad (6)$$

$$\begin{cases} v'_{2x} = \frac{(v_{1x}-v_{0x})}{w}(x2'-x0) + \frac{(v_{2x}-v_{0x})}{h}(y2'-y0) + v_{0x} \\ v'_{2y} = \frac{(v_{1y}-v_{0y})}{w}(x2'-x0) + \frac{(v_{2y}-v_{0y})}{h}(y2'-y0) + v_{0y} \end{cases} \quad (7)$$

where (x0', y0'), (x1', y1'), and (x2', y2') are the coordinates of control-points in current block 520.

Similarly, if the affine motion model for the candidate block is a 4-parameter affine motion model, then video encoder 200 and/or video decoder 300 may be configured to apply equation (4). If the affine motion model for the current block is a 4-parameter affine motion model, then equation (6) can be ignored.

Figure 8:
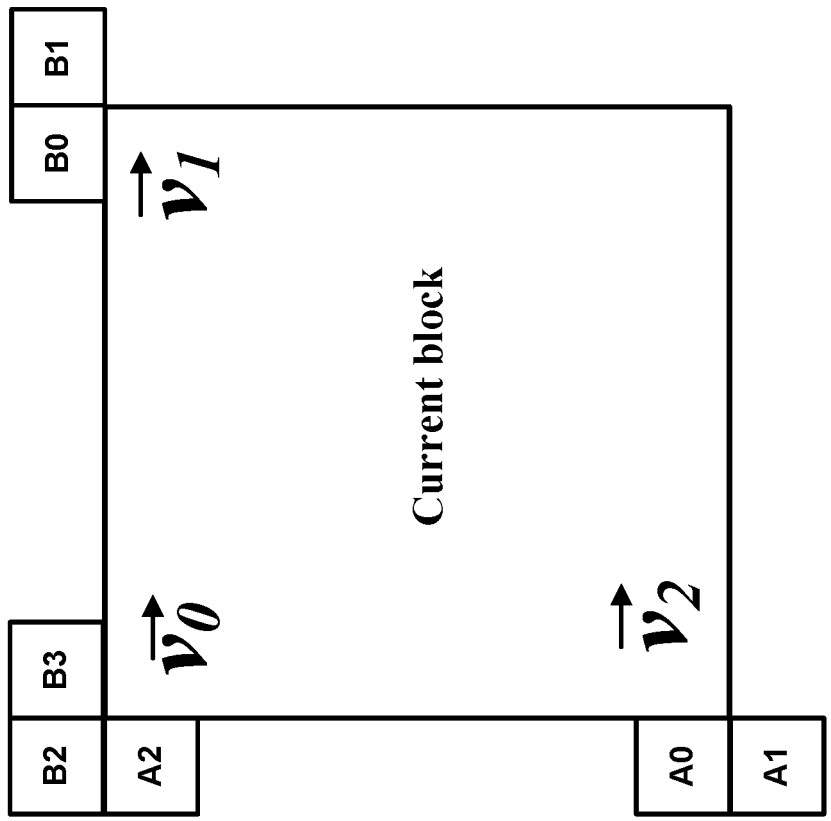
FIG. 8 is a conceptual diagram illustrating example candidate blocks for an inherited affine motion vector predictor.

In the example above, candidate block A 530 may be located in a different position, such as positions A0, B0, B1, A1, or B2, as shown in FIG. 8.

Constructed affine motion vector predictors will now be described. Video encoder 200 and/or video decoder 300 may be configured to derive constructed affine motion vector predictors by predicting the motion vectors at the control points of the current block, as in normal motion vector prediction. For example, as shown in FIG. 8, the control point motion vector $\vec{v}_0$ at the top-left control point can be predicted by the normal (e.g., translational) motion vector at B2, B3 or A2, the control point motion vector $\vec{v}_1$ at the top-right control point can be predicted by the normal (e.g., translational) motion vector at B0 or B1, and the control point motion vector $\vec{v}_2$ at the left-bottom control point can be predicted by the normal (e.g., translational) motion vector at A0 or A1.

Examples of pruning of affine motion vector predictors will now be described. To remove duplicate affine motion vector predictors, video encoder 200 and/or video decoder 300 may be configured to apply a pruning process. When comparing two affine motion vector predictors, video encoder 200 and/or video decoder 300 may be configured to compare motion vectors at the control points. In the case of multiple reference frames, video encoder 200 and/or video decoder 300 may be configured to also compare the reference index. In the case of bi-directional prediction, video encoder 200 and/or video decoder 300 may be configured to compare both the motion vectors at control points and the reference index for both prediction directions.

This disclosure describes techniques for performing affine motion prediction. Video encoder 200 and video decoder 300 may be configured to perform any of the techniques below independently. In addition, video encoder 200 and video decoder 300 may be configured to perform the techniques below in any combination.

In some examples, this disclosure describes simplified pruning techniques for affine motion vector predictors. In some examples, video encoder 200 and/or video decoder 300 may be configured to compare only one motion vector at a designated control point during the pruning process instead of comparing the motion vectors at all the control points. In one example, the designated control point is the top-left control point. Video encoder 200 and/or video decoder 300 may be configured to discard a new affine motion vector predictor if control point motion vector $\vec{v}_0$ of the new predictor is the same as the control point motion vector $\vec{v}_0$ of any existing affine motion vector predictor in the affine motion vector predictor list.

In another example, the designated control point is the top-right control point. Video encoder 200 and/or video decoder 300 may be configured to discard a new affine motion vector predictor if the control point motion vector $\vec{v}_1$ of the new predictor is the same as the control point motion vector $\vec{v}_1$ of any existing affine motion vector predictor in the affine motion vector predictor list.

In still another example, the designated control point is the bottom-left control point. Video encoder 200 and/or video decoder 300 may be configured to discard new affine motion vector predictor if the control point motion vector $\vec{v}_2$ of the new predictor is the same as the control point motion vector $\vec{v}_2$ of any existing affine motion vector predictor in the affine motion vector predictor list. Note that the reference index may also be compared during the comparison, if applicable.

In another example, the pruning process may depend on the type of affine motion vector predictor. For example, if the new affine motion vector predictor is an inherited affine motion vector predictor, video encoder 200 and/or video decoder 300 may be configured to compare only one motion vector at the designated control point. If the new affine motion vector predictor is a constructed affine motion vector predictor, video encoder 200 and/or video decoder 300 may be configured to not apply the pruning process.

In another example, this disclosure describes techniques that may allow for line buffer reduction for inherited affine motion vector prediction. Since motion information predictors are derived from the reconstructed motion information of previously reconstructed blocks, the motion parameters from previously reconstructed blocks are stored in a motion parameter buffer.

In a typical decoder design, a working buffer is used to store the reconstructed data such as pixel values, coding information (e.g., skip mode, prediction mode, merge mode) and also the reconstructed motion information (e.g., reference picture index, motion vectors) for a pre-defined working block size (e.g., CTU or largest coding unit (LCU)). Typically, the working buffer uses a local memory with very low access latency, such as cache, on-chip memory. For simplicity, the working block size is assumed as the CTU size in the following context of this disclosure. For each block within the CTU, if the predicting coding information is derived from the neighboring blocks within the same CTU, video decoder 300 only needs to fetch the data stored in the working buffer. However, when the prediction coding information is derived from the blocks outside the CTU which the current block belongs to, the prediction information then has to be fetched from a buffer outside the working buffer which may cause longer latency. To solve this issue, a line buffer is used to avoid long access latency.

A line buffer is a local memory with low access latency and is used to store the predicting coding information of the blocks outside the current working block (e.g. a working CTU) and the stored information is usually the one used for spatial prediction for the following blocks. It is a common practice that CTUs are encoded/decoded in a raster-scan order when it comes to a large-resolution video, and the reconstructed samples and other coding information are normally written to a distant/non-local memory area (e.g., DDR SRAM) after decoding the CTU, so that the local memory (normally of very limited size compared to the video data) can be released for encoding/decoding of subsequent CTUs.

Figure 9:
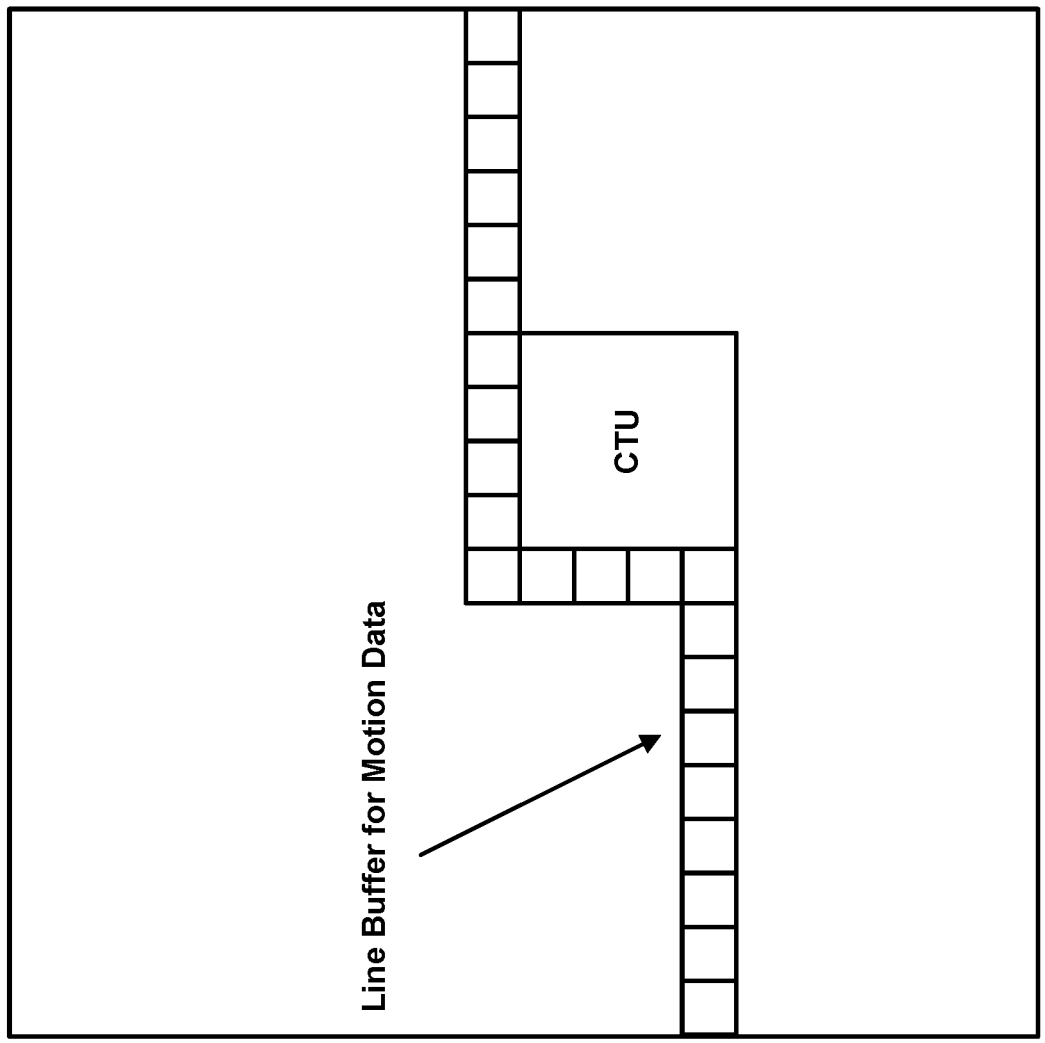
FIG. 9 is a conceptual diagram illustrating an example line buffer.

When starting to encode/decode the second CTU row onwards, the reconstructed samples and other coding information from the bottom of the previous CTU row are re-loaded into a local memory, such that the data from the above CTU can be made available once the computation units need them during the encoding/decoding process. For example, as shown in FIG. 9, in a typical HEVC implementation, a line buffer is used to store the motion information of a line of 4×4 block across the picture width plus one CTU height for the purpose of spatial motion vector (MV) prediction.

Figure 10:
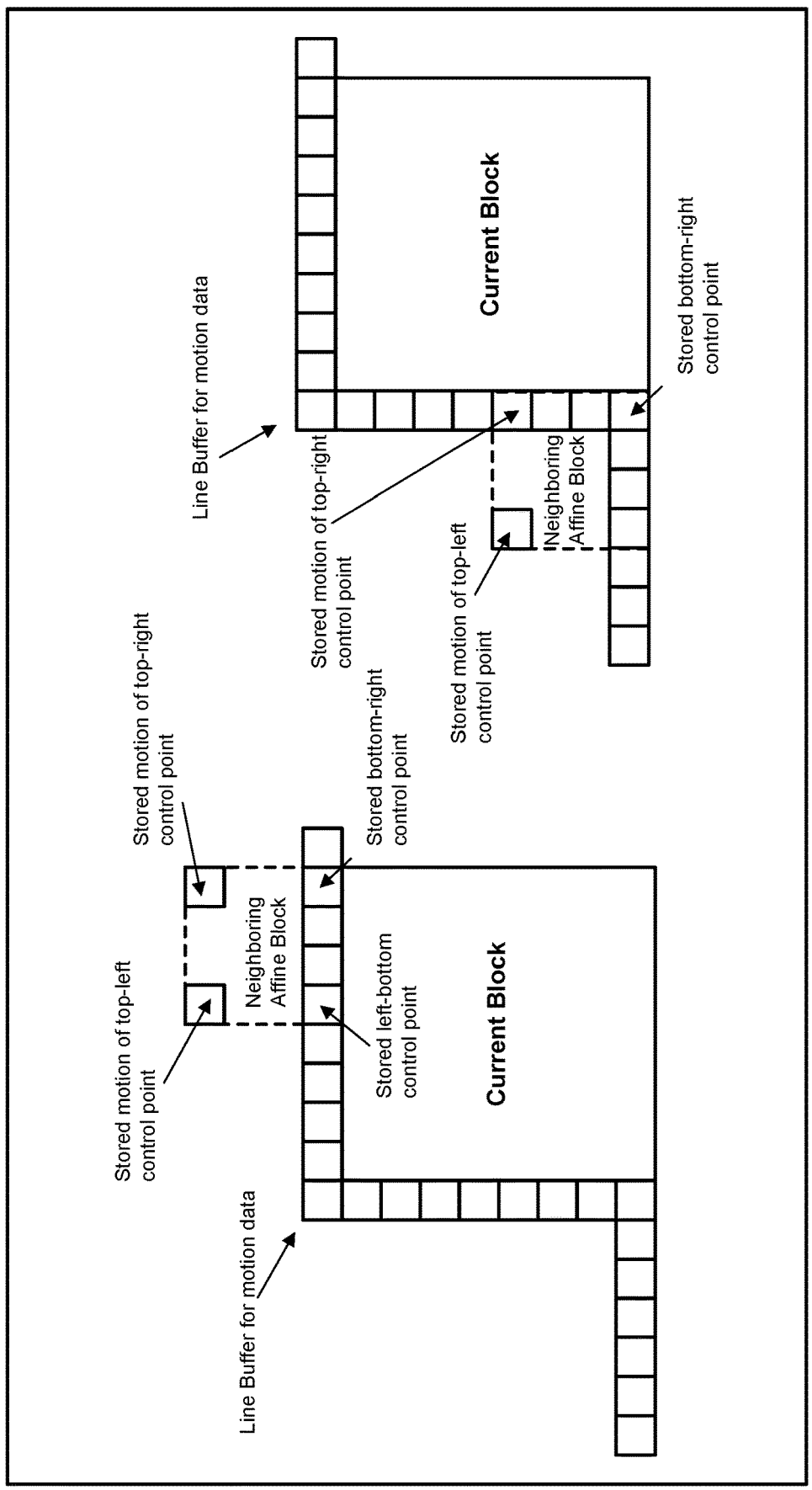
FIG. 10 is a conceptual diagram illustrating an example neighboring affine block beyond a line buffer.

For the inherited affine motion vector predictor, an additional line buffer may be beneficial in order to store the motion vectors at all the control points if the neighboring candidate block is located outside the current CTU. As illustrated in FIG. 10, an additional buffer is used to store the top-left control point motion information and top-right control point motion information if the neighboring block is located outside the current CTU of the current block.

To reduce the additional line buffer for the inherited affine motion vector predictor, video encoder 200 and/or video decoder 300 may be configured to only use the stored control point motion vectors in the original line buffer to derive the predictor. For example, if the neighboring block is located at the above CTU, the 4-parameter affine motion model is assumed for the neighboring block, regardless of its actual affine motion model, and video encoder 200 and/or video decoder 300 may be configured to use the left-bottom control point MV and bottom-right control point MV to derive the affine motion model for the neighboring block and then the predictor. If the neighboring block is located at the left CTU, the 4-parameter affine motion model is also assumed for the neighboring block, regardless of its actual affine motion model, and video encoder 200 and/or video decoder 300 may be configured to use the top-right control point MV and bottom-right control point MV to derive the affine motion model for the neighboring block and then the predictor.

In another example, video encoder 200 and/or video decoder 300 may be configured to store a limited number of top-left control point MVs in an additional line buffer. Video encoder 200 and/or video decoder 300 may be configured to use a flag in the line buffer to indicate whether a 6-parameter affine neighboring block's top-left control point MV is stored in the additional line buffer. If the neighboring block is located at the above CTU, is coded using a 6-parameter affine motion model, and the flag is true, then video encoder 200 and/or video decoder 300 may be configured to uses the stored top-left control point MV and the bottom-left and bottom-right control point MVs to derive the affine motion model and then the predictor. If the neighboring block is located at the left CTU, is coded using a 6-parameter affine motion model, and the flag is true, then video encoder 200 and/or video decoder 300 may be configured to use the stored top-left control point MV and the top-right and bottom-right control point MVs to derive the affine motion model and then the predictor. If the flag is false, then the 6-parameter affine motion model is considered as the 4-parameter affine motion model. In this case, video encoder 200 and/or video decoder 300 may be configured to use the two control point MVs stored in the original line buffer to derive the affine motion model and then the predictor.

In one example, the limited number of top-left control point MVs in an additional line buffer can be 1 or other integer numbers. For the above CTU, the top-left control point MV to be stored can be selected by choosing the 6-parameter affine motion model block in the bottom boundary of the above CTU that has the smallest X coordinate. For the left CTU, the top-left control point MV to be stored can be selected by choosing the 6-parameter affine motion model block in the right boundary of the left CTU that has the smallest Y coordinate.

In another example, the limited number of top-left control point MVs in an additional line buffer can be 1 or other integer numbers. For the above CTU, the top-left control point MV to be stored can be selected by choosing the 6-parameter affine motion model block in the bottom boundary of the above CTU that has the largest X coordinate. For the left CTU, the top-left control point MV to be stored can be selected by choosing the 6-parameter affine motion model block in the right boundary of the left CTU that has the largest Y coordinate.

In another example, the limited number of top-left control point MVs in an additional line buffer can be 1 or other integer numbers. For the above CTU, the top-left control point MV to be stored can be selected by choosing the 6-parameter affine motion model block that locates in the middle of bottom boundary of the above CTU. If the block located in the middle of bottom boundary of the above CTU is not coded by affine motion, the top-left control point MV is considered as unavailable. For the left CTU, the top-left control point MV to be stored can be selected by choosing the 6-parameter affine motion model block that is located in the middle of right boundary of the left CTU. If the block located in the middle of right boundary of the left CTU is not coded by affine motion, the top-left control point MV is considered as unavailable.

In another example, the limited number of top-left control point MVs can be 1 or other integer numbers. For the above CTU, the top-left control point MV to be stored can be selected by choosing the 6-parameter affine motion model block in the bottom boundary of the above CTU that has the largest area. For the left CTU, the top-left control point MV to be stored can be selected by choosing the 6-parameter affine motion model block in the right boundary of the left CTU that has the largest area.

In another example, the limited number of top-left control point MVs can be 1 or other integer numbers. For the above CTU, the top-left control point MV to be stored can be selected by choosing the 6-parameter affine motion model block in the bottom boundary of the above CTU that has the largest width. For the left CTU, the top-left control point MV to be stored can be selected by choosing the 6-parameter affine motion model block in the right boundary of the left CTU that has the largest height.

In still another example, the MVs of the left CTU are all stored and a limited number of top-left control point MVs are stored in the additional line buffer for the above CTU. The selection of stored top-left control point for the above CTU can be similar to those described above.

An example of deriving inherited affine motion vector predictor with line buffer reduction is described in below. The variable (neiX, neiY) specifies the coordinate of the top-left sample of the candidate block, the variable (neiW, neiH) specifies the size of the candidate block, the variable (curX, curY) specifies the coordinate of the top-left sample of the current block, and the variable (curW, curH) specifies the size of the current block. The variable affTopLeftIsInLineBuf specifies whether the top-left control point MV of the candidate block is stored in a line buffer.

If the candidate block is in the above CTU, the following applies: (mvRB$_x$, mvRB$_y$) is set equal to the bottom-right control point MV of the candidate block and (mvLB$_x$, mvLB$_y$) is set equal to the bottom-left control point MV of the candidate block.

$$dMvHorX = \frac{mvRB_x - mvLB_x}{neiW}$$

$$dMvHorY = \frac{mvRB_y - mvLB_y}{neiW}$$

The values of posNeiX and posNeiY are set equal to the x and y coordinates of the top-left sample of the candidate block.

If affTopLeftIsInLineBuf is true, (mvLT$_x$, mvLT$_y$) is set equal to the top-left control point MV of the candidate block.

$$dMvVerX = \frac{mvLB_x - mvLT_x}{neiH}$$

$$dMvVerY = \frac{mvLB_y - mvLT_y}{neiH}$$

(mvAnchor$_x$, mvAnchor$_y$) is set equal to (mvLT$_x$, mvLT$_y$).

else $dMvVerX = -dMvHorY$ $dMvVerY = dMvHorX$ posNeiY is set equal to posNeiY + neiH (mvAnchor$_x$, mvAnchor$_y$) is set equal to (mvLB$_x$, mvLB$_y$)

Else if the candidate block is in the left CTU, the following applies: (mvRB$_x$, mvRB$_y$) is set equal to the bottom-right control point MV of the candidate block, and (mvRT$_x$, mvRT$_y$) is set equal to the top-right control point MV of the candidate block.

$$dMvVerX = \frac{mvRB_x - mvRT_x}{neiH}$$

$$dMvVerY = \frac{mvRB_y - mvRT_y}{neiH}$$

If affTopLeftIsInLineBuf is true, (mvLT$_x$, mvLT$_y$) is set equal to the top-left control point MV of the candidate block.

$$dMvHorX = \frac{mvRT_x - mvLT_x}{neiW}$$

$$dMvHorY = \frac{mvRT_y - mvLT_y}{neiW}$$

(mvAnchor$_x$, mvAnchor$_y$) is set equal to (mvLT$_x$, mvLT$_y$).

else $dMvHorX = dMvVerY$ $dMvHorY = -dMvVerX$ posNeiX is set equal to posNeiX + neiW (mvAnchor$_x$, mvAnchor$_y$) is set equal to (mvRT$_x$, mvRT$_y$)

Else if the candidate block is in the current CTU, the following applies: (mvRT$_x$, mvRT$_y$) is set equal to the top-right control point MV of the candidate block, and (mvLT$_x$, mvLT$_y$) is set equal to the top-left control point MV of the candidate block. (mvAnchor$_x$, mvAnchor$_y$) is set equal to (mvLT$_x$, mvLT$_y$).

$$dMvHorX = \frac{mvRT_x - mvLT_x}{neiW}$$

$$dMvHorY = \frac{mvRT_y - mvLT_y}{neiW}$$

If the affine motion model of the candidate block is the 6-parameter affine motion model, (mvLB$_x$, mvLB$_y$) is set equal to the bottom-left control point MV of the candidate block.

$$dMvVerX = \frac{mvLB_x - mvLT_x}{neiH}$$

$$dMvVerY = \frac{mvLB_y - mvLT_y}{neiH}$$

else $dMvVerX = -dMvHorY$ $dMvVerY = dMvHorX$

The predicted top-left control point MV (v0x, v0y) of the current block is derived as:

v0x=mvAnchor$_x$+dMvHorX*(curX−neiX)+dMvVerX*(curY−neiY)

v0y=mvAnchor$_y$+dMvHorY*(curX−neiX)+dMvVerY*(curY−neiY)

The predicted top-right control point MV (v1x, v1y) of the current block is derived as:

v1x=mvAnchor$_x$+dMvHorX*(curX+curW−neiX)+dMvVerX*(curY−neiY)

v1y=mvAnchor$_y$+dMvHorY*(curX+curW−neiX)+dMvVerY*(curY−neiY)

The predicted bottom-left control point MV (v2x, v2y) of the current block is derived as:

v2x=mvAnchor$_x$+dMvHorX*(curX−neiX)+dMvVerX*(curY+curH−neiY)

v2y=mvAnchor$_y$+dMvHorY*(curX−neiX)+dMvVerY*(curY+curH−neiY)

The division used in the above techniques can be replaced by scaling and right shifting the result. For example, if the candidate block is in the current CTU, the following applies:

$(mvAnchor_x, mvAnchor_y)$ is set equal to $(mvLT_x<<maxShift, mvLT_y<<maxShift)$.

$dMvHorX = (mvRT_x - mvLT_x) << (maxShift - \log 2(neiW))$ $dMvHorY = (mvRT_y - mvLT_y) << (maxShift - \log 2(neiW))$, where << is a bitwise left shift. The variable maxShift is the log 2 of the maximum block size. For example, maxShift is set equal to 7, indicating the maximum block size is 128.

If the affine motion model of the candidate block is the 6-parameter affine motion model, $(mvLB_x, mvLB_y)$ is set equal to the bottom-left control point MV of the candidate block.

$dMvVerX = (mvLB_x - mvLT_x) << (maxShift - \log 2(neiH))$ $dMvVerY = (mvLB_y - mvLT_y) << (maxShift - \log 2(neiH))$ else $dMvVerX = -dMvHorY$ $dMvVerY = dMvHorX$ offset is set equal to $1 << (maxShift-1)$ The predicted top-left control point MV (v0x, v0y) of the current block is derived as:

$v0x = mvAnchor_x + dMvHorX*(curX-neiX) + dMvVerX*(curY-neiY)$ $v0y = mvAnchor_y + dMvHorY*(curX-neiX) + dMvVerY*(curY-neiY)$ $v0x = v0x > 0 ? (v0x+offset) >> maxShift : -((-v0x+offset) >> maxShift)$ $v0y = v0y > 0 ? (v0y+offset) >> maxShift : -((-v0y+offset) >> maxShift)$ The predicted top-right control point MV (v1x, v1y) of the current block is derived as:

$v1x = mvAnchor_x + dMvHorX*(curX+curW-neiX) + dMvVerX*(curY-neiY)$ $v1y = mvAnchor_y + dMvHorY*(curX+curW-neiX) + dMvVerY*(curY-neiY)$ $v1x = v1x > 0 ? (v1x+offset) >> maxShift : -((-v1x+offset) >> maxShift)$ $v1y = v1y > 0 ? (v1y+offset) >> maxShift : -((-v1y+offset) >> maxShift)$ The predicted bottom-left control point MV (v2x, v2y) of the current block is derived as:

$v2x = mvAnchor_x + dMvHorX*(curX-neiX) + dMvVerX*(curY+curH-neiY)$ $v2y = mvAnchor_y + dMvHorY*(curX-neiX) + dMvVerY*(curY+curH-neiY)$ $v2x = v2x > 0 ? (v2x+offset) >> maxShift : -((-v2x+offset) >> maxShift)$ $v2y = v2y > 0 ? (v2y+offset) >> maxShift : -((-v2y+offset) >> maxShift)$, where >> is a bitwise right shift.

Techniques of using a motion compensation motion vector (e.g., a normal, translational motion vector) as a control point in inherited affine motion vector predictors are now described.

Video encoder 200 and video decoder 300 may implement affine motion compensation using sub-block based motion compensation. That is, video encoder 200 and video decoder 300 may derive a motion vector for each sub-block based on the affine motion model, and then normal block-based motion compensation or block matching is applied according to the derived motion vector. The derivation of the sub-block motion vector is usually done by using the center coordinate of the sub-block.

In the case that the sub-block motion vector (e.g., that is used for motion compensation) is stored in the motion buffer instead of the control point motion vector, the inherited affine motion vector predictor derivation process may be adjusted accordingly. More specifically, the (neiX, neiY) and (neiW, neiH) may be modified according to the sub-block size. The size of sub-block is (subBlkW, subBlkH). The values of (neiW, neiH) are modified as (neiW-subBlkW, neiH-subBlkH). In some examples, the modified values may not be a power of 2. The division used in inherited affine motion vector predictor derivation process can be simplified by scaling according to a look up table, and shifting the results. The variable (neiX, neiY) may be modified such that the center of the sub-block where the control point is located is shifted. For example, if the candidate block is in the current CTU, the following applies.

A look up table LUT is derived by $LUT[x] = (x*(1 << LUTPREC))/x$, wherein LUTPREC is the predefined precision (e.g., 6 or other integer numbers). The values of (neiX, neiY) are set equal to (neiX+subBlkW/2, neiY+subBlkH/2). $(mvAnchor_x, mvAnchor_y)$ is set equal to $(mvLT_x << maxShift, mvLT_y, maxShift)$.

$dMvHorX = (mvRT_x - mvLT_x) << (maxShift - \log 2(neiW))$ $dMvHorY = (mvRT_y - mvLT_y) << (maxShift - \log 2(neiW))$ $dMvHorX = dMvHorX * LUT[neiW-subBlkW]$ $dMvHorY = dMvHorY * LUT[neiW-subBlkW]$ If the affine motion model of the candidate block is the 6-parameter affine motion model, $(mvLB_x, mvLB_y)$ is set equal to the bottom-left control point MV of the candidate block.

$dMvVerX = (mvLB_x - mvLT_x) << (maxShift - \log 2(neiH))$ $dMvVerY = (mvLB_y - mvLT_y) << (maxShift - \log 2(neiH))$ $dMvVerX = dMvHorX * LUT[neiH-subBlkH]$ $dMvVerY = dMvHorY * LUT[neiW-subBlkW]$ else $dMvVerX = -dMvHorY$ $dMvVerY = dMvHorX$ offset is set equal to $1 << (maxShift-1)$.

The predicted top-left control point MV (v0x, v0y) of the current block is derived as:

$$v0x = mvAnchor_x + (dMvHorX*(curX-neiX)) \gg \text{LUTPREC}) + (dMvVerX*(curY-neiY)) \gg \text{LUTPREC})$$

$$v0y = mvAnchor_y + ((dMvHorY*(curX-neiX)) \gg \text{LUTPREC}) + (dMvVerY*(curY-neiY)) \gg \text{LUTPREC})$$

$$v0x = v0x > 0 ? (v0x+\text{offset}) \gg \text{maxShift} : -((-v0x+\text{offset}) \gg \text{maxShift})$$

$$v0y = v0y > 0 ? (v0y+\text{offset}) \gg \text{maxShift} : -((-v0y+\text{offset}) \gg \text{maxShift})$$

The predicted top-right control point MV (v1x, v1y) of the current block is derived as:

$$v1x = mvAnchor_x + (dMvHorX*(curX+curW-neiX)) \gg \text{LUTPREC}) + (dMvVerX*(curY-neiY)) \gg \text{LUTPREC})$$

$$v1y = mvAnchor_y + (dMvHorY*(curX+curW-neiX)) \gg \text{LUTPREC}) + (dMvVerY*(curY-neiY)) \gg \text{LUTPREC})$$

$$v1x = v1x > 0 ? (v1x+\text{offset}) \gg \text{maxShift} : -((-v1x+\text{offset}) \gg \text{maxShift})$$

$$v1y = v1y > 0 ? (v1y+\text{offset}) \gg \text{maxShift} : -((-v1y+\text{offset}) \gg \text{maxShift})$$

The predicted bottom-left control point MV (v2x, v2y) of the current block is derived as:

$$v2x = mvAnchor_x + (dMvHorX*(curX-neiX)) \gg \text{LUTPREC}) + (dMvVerX*(curY+curH-neiY)) \gg \text{LUTPREC})$$

$$v2y = mvAnchor_y + (dMvHorY*(curX-neiX)) \gg \text{LUTPREC}) + (dMvVerY*(curY+curH-neiY)) \gg \text{LUTPREC})$$

$$v2x = v2x > 0 ? (v2x+\text{offset}) \gg \text{maxShift} : -((-v2x+\text{offset}) \gg \text{maxShift})$$

$$v2y = v2y > 0 ? (v2y+\text{offset}) \gg \text{maxShift} : -((-v2y+\text{offset}) \gg \text{maxShift})$$

Similar modifications can be applied to the case when the candidate block is in the above CTU or left CTU. If the candidate block is in the above CTU and the value of affTopLeftIsInLineBuf for the candidate block is not true, then (neiX, neiY) is set equal to (neiX+subBlkW/2, neiY+neiH−subBlkH/2). If the candidate block is in the left CTU and the value affTopLeftIsInLineBuf for the candidate block is not true, then (neiX, neiY) is set equal to (neiX+neiW−subBlkW/2, neiY+subBlkH/2).

Modified inherited affine motion vector predictors will now be described. The inherited affine motion vector predictor can be modified to create a new affine motion vector predictor. The modification can be done by replacing one (or two) control point motion vector(s) with new motion vector(s).

In one example, the modified control point motion vector is at a fixed designated location (e.g., the top-left control point, top-right control point or bottom-left control point).

In another example, the modified control point motion vector depends on the location of the neighboring candidate block. For example, if the candidate block is at location A0 or A1 (e.g., see FIG. 8), the modified control point MV is at the top-right control point. If the candidate block is at location B0 or B1, the modified control point MV is at the bottom-left control point. If the candidate block is at location B2, the modified control point MV depends on width and height of the candidate block. If the width is larger than the height, the modified control point MV is at the top-right control point, otherwise the modified control point MV is at the bottom-left control point.

In another example, the modified control point MV also depends on the target affine motion model for the current block. For example, if the target affine motion model for the current block is the 6-parameter affine motion model and the candidate block is at location B0 or B1, the modified control point MV is at the bottom-left control point, otherwise the modified control point MV is at the top-right control point.

Affine motion vector predictor list construction for affine advanced motion vector prediction (AMVP) mode will now be described.

Similar to the HEVC AMVP mode, when encoding a block using the affine AMVP mode, video encoder 200 may signal an affine motion vector predictor index into an affine AMVP motion vector predictor list as well as the motion vector difference for each control point. Video decoder 300 constructs the same affine AMVP motion vector predictor list. Video decoder 300 receives the affine motion vector predictor index and retrieves the control point motion vectors from the affine AMVP motion vector predictor list associated with the received index. Video decoder 300 adds the received motion vector differences to the retrieved control point motion vector from the affine AMVP motion vector predictor list to reconstruct the control point motion vectors for to the block of video data. Video decoder 300 then decodes the block of video data using the reconstructed control point motion vectors using affine motion compensation.

This disclosure describes techniques for constructing the affine AMVP motion vector predictor list. In particular, for some example blocks, video encoder 200 and video decoder 300 may construct the affine AMVP motion vector predictor list such that the list includes one or more inherited affine motion vector predictors, one or more constructed affine motion vector predictors, and one or more affine motion vector predictors that have all control point motion vectors equal to a designated motion vector. By including multiple types of candidates in the affine AMVP motion vector predictor list, video encoder 200 and video decoder 300 better ensure that a more accurate candidate is available for control point motion vector prediction, thus increasing bitrate and/or improving image quality.

In one example of the disclosure, video encoder 200 and video decoder 300 may be configured to construct an affine AMVP motion vector predictor list using the following steps.

1. Video encoder 200 and video decoder 300 insert one or more inherited affine motion vector predictors derived from neighboring candidate blocks.
2. If the number of existing predictors in the list is less than a predefined maximum number, video encoder 200 and video decoder 300 insert one or more constructed affine motion vector predictors.
3. If the number of existing predictor in the list is still less than the predefined maximum number after inserting both inherited and constructed affine motion vector predictors, video encoder 200 and video decoder 300 insert one or more affine motion vector predictors that have all the control point motion vectors equal to one derived motion vector (e.g., also called a designated motion vector).

As can be seen from the techniques above, for some blocks, video encoder 200 and video decoder 300 may insert only inherited affine motion vector predictors in the case that there are enough (e.g., up to the predefined maximum number) of inherited affine motion vector predictors available from neighboring blocks. For other example blocks, video encoder 200 and video decoder may insert only inherited affine motion vector predictors and constructed affine motion vector predictors. However, in accordance with the techniques of this disclosure, when the neighboring blocks of the currently coded block have less than the predefined maximum number of inherited and/or constructed affine motion vector predictors, video encoder 200 and video decoder 300 may further add one or more affine motion vector predictors that have all the control point motion vectors equal to one designated motion vector. In this way, a full affine AMVP motion vector predictor list may be constructed regardless of the number of inherited or constructed affine motion vector predictors that are available.

Accordingly, in one example of the disclosure, video encoder 200 may be configured to receive a block of video data to be encoded using affine advanced motion vector prediction (AMVP) mode. Video encoder 200 may be further configured to construct an affine AMVP motion vector predictor list of candidate control point motion vectors for the block of video data, the affine AMVP motion vector predictor list including one or more affine motion vector predictors that have all control point motion vectors equal to a designated motion vector. In this example, the affine AMVP motion vector predictor list may further include at least one or more inherited affine motion vector predictor or one or more constructed affine motion vector predictors. That is, in some examples, the affine AMVP motion vector predictor list may include one inherited affine motion vector predictor or one constructed affine motion vector predictor along with one affine motion vector predictor that has all control point motion vectors equal to a designated motion vector. This example may result when the maximum number of candidates in the affine AMVP motion vector predictor list is two. Of course, in other examples, the affine AMVP motion vector predictor list may be larger than two. In those examples, there may be multiples of the inherited affine motion vector predictors, constructed affine motion vector predictors, and affine motion vector predictors that have all control point motion vectors equal to a designated motion vector.

Techniques for determining the designated motion vector will be described in more detail below. Video encoder 200 may be further configured to determine control point motion vectors for the block of video data from the affine AMVP motion vector predictor list, and encode the block of video data using the determined control point motion vectors.

In one example, as described above, to construct the affine AMVP motion vector predictor list of candidate control point motion vectors for the block of video data, video encoder 200 is configured to insert the one or more inherited affine motion vector predictors into the affine AMVP motion vector predictor list. Video encoder 200 may be further configured to insert, if a number of the one or more inherited affine motion vector predictors is less than a predefined maximum number for the affine AMVP motion vector predictor list, the one or more constructed affine motion vector predictors into the affine AMVP motion vector predictor list. Video encoder 200 may be further configured to insert, if a number of the one or more inherited affine motion vector predictors and the one or more constructed affine motion vector predictors is less than the predefined maximum number for the affine AMVP motion vector predictor list, the one or more affine motion vector predictors that have all control point motion vectors equal to the designated motion vector into the affine AMVP motion vector predictor list.

Video encoder 200 may be further configured to determine candidate control point motion vectors in the affine AMVP motion vector predictor list, encode an index to the affine AMVP motion vector predictor list corresponding to the determined candidate control point motion vectors, determine a motion vector difference for each of the control point motion vectors for the block relative to the determined candidate control point motion vectors, and encode the motion vector differences.

In a reciprocal manner, video decoder 300 may be configured to receive a block of video data encoded using affine advanced motion vector prediction (AMVP) mode. Video decoder 300 may be further configured to construct an affine AMVP motion vector predictor list of candidate control point motion vectors for the block of video data, the affine AMVP motion vector predictor list including one or more affine motion vector predictors that have all control point motion vectors equal to a designated motion vector. Techniques for determining the designated motion vector will be described in more detail below. Video decoder 300 may be further configured to determine control point motion vectors for the block of video data from the affine AMVP motion vector predictor list, and decode the block of video data using the determined control point motion vectors.

In one example, as described above, to construct the affine AMVP motion vector predictor list of candidate control point motion vectors for the block of video data, video decoder 300 is configured to insert the one or more inherited affine motion vector predictors into the affine AMVP motion vector predictor list. Video decoder 300 may be further configured to insert, if a number of the one or more inherited affine motion vector predictors is less than a predefined maximum number for the affine AMVP motion vector predictor list, the one or more constructed affine motion vector predictors into the affine AMVP motion vector predictor list. Video decoder 300 may be further configured to insert, if a number of the one or more inherited affine motion vector predictors and the one or more constructed affine motion vector predictors is less than the predefined maximum number for the affine AMVP motion vector predictor list, the one or more affine motion vector predictors that have all control point motion vectors equal to the designated motion vector into the affine AMVP motion vector predictor list.

To determine the control point motion vectors for the block, video decoder 300 may be configured to receive an index to the affine AMVP motion vector predictor list, and receive a motion vector difference for each of the control point motion vectors for the block. That is, video decoder 300 may receive a motion vector difference for each of the two (e.g., for a 4-parameter affine motion model) or three (e.g., for a 6-parameter affine motion model) control point motion vectors of the particular candidate indicated by the index into the affine AMVP motion vector predictor list. Video decoder 300 may be configured to retrieve the candidate control point motion vectors associated with the index, and add the motion vector difference for each of the control point motion vectors for the block to the candidate control point motion vectors to determine the control point motion vectors for the block.

Figure 11:
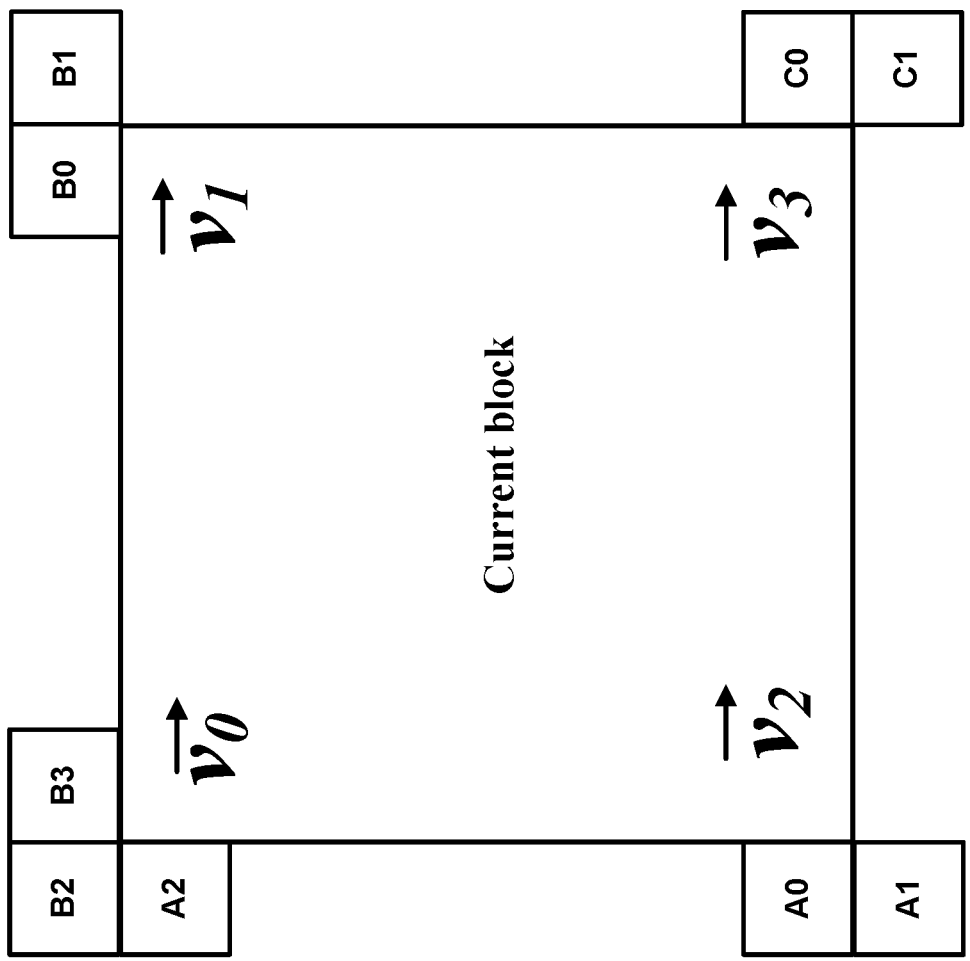
FIG. 11 is a conceptual diagram illustrating an example current block for flexible coder order.

Video encoder 200 and video decoder 300 may be configured to insert the inherited affine motion vector predictors using one or more different insertion orders. The locations of potential inherited affine motion vector predictors relative to a current block are shown in FIG. 11. Possible locations include relative locations A0, A1, A2, B0, B1, B2, B3, C0, and C1. In the below description, a block is "available" if it meets the criteria for having the associated type of affine motion vector candidate. For example, the candidate block is available if it is an affine coded block for inherited affine motion vector predictors. The candidate block is unavailable if it is coded using a different mode. Likewise, the candidate block is available if it is an inter predicted block for constructed affine motion vector predictors. The candidate block is unavailable if it is coded using a different mode.

In one example, video encoder 200 and video decoder 300 may be configured to insert inherited affine motion vector predictors in the affine AMVP motion vector predictor list in this following order:

If the A1 candidate block is available and it is coded using an affine motion model, then the inherited affine motion vector predictor from A1 is inserted into the list and availableA1 is set equal to true, otherwise availableA1 is set equal to false.

If availableA1 is false and the A0 candidate block is available and it is coded using an affine motion model, then the inherited affine motion vector predictor from A0 is inserted into the list.

If the B1 candidate block is available and it is coded using an affine motion model, then the inherited affine motion vector predictor from B1 is inserted into the list and availableB1 is set equal to true, otherwise availableB1 is set equal to false.

If availableB1 is false and the B0 candidate block is available and it is coded using an affine motion model, then the inherited affine motion vector predictor from B0 is inserted into the list and availableB0 is set equal to true, otherwise availableB0 is set equal to false.

If availableB1 is false and availableB0 is false and the B2 candidate block is available and it is coded using an affine motion model, then the inherited affine motion vector predictor from B2 is inserted into the list.

In another example, the following applies:

If the A0 candidate block is available and it is coded using an affine motion model, then the inherited affine motion vector predictor from A0 is inserted into the list and availableA0 is set equal to true, otherwise availableA0 is set equal to false.

If availableA0 is false and the A1 candidate block is available, and it is coded using an affine motion model, then the inherited affine motion vector predictor from A1 is inserted into the list.

If the B0 candidate block is available and it is coded using an affine motion model, then the inherited affine motion vector predictor from B0 is inserted into the list and availableB0 is set equal to true, otherwise availableB0 is set equal to false.

If availableB0 is false and the B1 candidate block is available and it is coded using an affine motion model, then the inherited affine motion vector predictor from B1 is inserted into the list and availableB1 is set equal to true, otherwise availableB1 is set equal to false.

If availableB1 is false and availableB0 is false and the B2 candidate block is available and it is coded using an affine motion model, then the inherited affine motion vector predictor from B2 is inserted into the list.

In still another example, the following applies:

If the A1 candidate block is available and it is coded using an affine motion model, then the inherited affine motion vector predictor from A1 is inserted into the list and availableA1 is set equal to true, otherwise availableA1 is set equal to false.

If availableA1 is false and the A0 candidate block is available and it is coded using an affine motion model, then the inherited affine motion vector predictor from A0 is inserted into the list.

If the B1 candidate block is available and it is coded using an affine motion model, then the inherited affine motion vector predictor from B1 is inserted into the list and availableB1 is set equal to true, otherwise availableB1 is set equal to false.

If availableB1 is false and the B0 candidate block is available and it is coded using an affine motion model, then the inherited affine motion vector predictor from B0 is inserted into the list and availableB0 is set equal to true, otherwise availableB0 is set equal to false.

If the number of existing predictors in the list is less than a predefined maximum number and the B2 candidate block is available and it is coded using an affine motion model, then the inherited affine motion vector predictor from B2 is inserted into the list.

In still another example, the following applies:

If the A0 candidate block is available and it is coded using an affine motion model, then the inherited affine motion vector predictor from A0 is inserted into the list and availableA0 is set equal to true, otherwise availableA0 is set equal to false.

If availableA0 is false and the A1 candidate block is available, and it is coded using an affine motion model, then the inherited affine motion vector predictor from A1 is inserted into the list.

If the B0 candidate block is available and it is coded using an affine motion model, then the inherited affine motion vector predictor from B0 is inserted into the list and availableB0 is set equal to true, otherwise availableB0 is set equal to false.

If availableB0 is false and the B1 candidate block is available and it is coded using an affine motion model, then the inherited affine motion vector predictor from B1 is inserted into the list and availableB1 is set equal to true, otherwise availableB1 is set equal to false.

If the number of existing predictors in the list is less than a predefined maximum number and the B2 candidate block is available and it is coded using an affine motion model, then the inherited affine motion vector predictor from B2 is inserted into the list.

In still another example, the following applies:

If the A0 candidate block is available and it is coded using an affine motion model, then the inherited affine motion vector predictor from A0 is inserted into the list.

If the number of existing predictors in the list is less than a predefined maximum number and the B0 candidate block is available and it is coded using an affine motion model, then the inherited affine motion vector predictor from B0 is inserted into the list.

If the number of existing predictors in the list is less than a predefined maximum number and the B1 candidate block is available and it is coded using an affine motion model, then the inherited affine motion vector predictor from B1 is inserted into the list.

If the number of existing predictors in the list is less than a predefined maximum number and the A1 candidate block is available, and it is coded using an affine motion model, then the inherited affine motion vector predictor from A1 is inserted into the list.

If the number of existing predictors in the list is less than a predefined maximum number and the B2 candidate block is available and it is coded using an affine motion model, then the inherited affine motion vector predictor from B2 is inserted into the list.

In some examples, video encoder 200 and video decoder 300 may be configured to code blocks in a flexible coder order. In the case of a flexible coder order, the blocks located at C0 and C1, as shown in FIG. 11, may be coded before the current block and the blocks at A0 and A1. In this case, then the inherited affine motion vector predictors from A0 and A1 described above are replaced by the inherited affine motion vector predictors from C0 and C1.

Video encoder 200 and video decoder 300 may be configured to insert one or more constructed affine motion vector predictors into the affine AMVP motion vector predictor list using one or more of the techniques described below.

For the 6-parameter affine motion model, the constructed affine motion vector predictor includes a top-left control point motion vector, a top-right control point motion vector, and a bottom-left control point motion vector. For the 4-parameter affine motion model, the constructed affine motion vector predictor includes a top-left control point motion vector and a top-right control point motion vector.

In one example, video encoder 200 and video decoder 300 may add constructed affine motion vector predictors into the affine AMVP motion vector predictor list as follows:
Top-left control point MV is derived from the first available MV from the blocks in the locations {B2, B3, A2}.
Top-right control point MV is derived from the first available MV from the blocks in the locations {B0, B1}.
Bottom-left control point MV is derived from the first available MV from the blocks in the locations {A0, A1}.

In another example, the following applies:
Top-left control point MV is derived from the first available MV from the blocks in the locations {B2, B3, A2}.
Top-right control point MV is derived from the first available MV from the blocks in the locations {B1, B0}.
Bottom-left control point MV is derived from the first available MV from the blocks in the locations {A1, A0}.

In still another example, the following applies:
Top-left control point MV is derived from the first available MV from the blocks in the location B2.
Top-right control point MV is derived from the first available MV from the blocks in the locations {B1, B0}
Bottom-left control point MV is derived from the first available MV from the blocks in the locations {A1, A0}

In still another example, the following applies:
Top-left control point MV is derived from the first available MV from the blocks in the location B2.
Top-right control point MV is derived from the first available MV from the blocks in the locations {B0, B1}
Bottom-left control point MV is derived from the first available MV from the blocks in the locations {A0, A1}

In some examples, if the bottom-left control point MV (v2x, v2y) is not available and the current affine motion model is the 6-parameter affine motion model, video encoder 200 and video decoder 300 may be configured to derive the bottom-left control point motion using the top-left control point motion vector (v0x, v0y) and the top-right control point motion vector (v1x, v1y) as follows:

$$v2x = v0x - (v1y - v0y)*curH/curW$$

$$v2y = v0y + (v1x - v0x)*curH/curW$$

In another example, if the current affine motion model is 6-parameter affine motion model and any of the control point motion vectors are not available, video encoder 200 and video decoder 300 may be configured to mark the constructed affine motion vector predictor as unavailable.

In some examples, if the top-right control point motion vector (v1x, v1y) is not available, video encoder 200 and video decoder 300 may be configured to derive the top-right control point motion vector using the top-left control point motion vector (v0x,v0y) and bottom-left control point motion vector (v2x, v2y) as follows:

$$v1x = v0x + (v2y - v0y)*curW/curH$$

$$v1y = v0y - (v2x - v0x)*curW/curH$$

In another example, if the top-left control point motion vector or the top-right control point motion vector is not available, video encoder 200 and video decoder 300 may be configured to mark the constructed affine motion vector predictor for the 6-parameter affine motion model as unavailable.

As described above, in some examples, video encoder 200 and video decoder 300 will add affine motion vector predictors that have all the control point motion vectors equal to one designated motion vector into the affine AMVP motion vector predictor list. That is, these types of affine motion vector predictors have the same value for each of the two or three control point motion vectors of the candidate, depending on the affine motion model used. Video encoder 200 and video decoder 300 may be configured to dynamically determine the designated motion vector for each block from a designated motion vector candidate list.

In one example, video encoder 200 and video decoder 300 may be configured to select the designated motion vector from an AMVP candidate list for normal, translational motion vector prediction (e.g., the HEVC AMVP candidate list).

In another example, video encoder 200 and video decoder 300 may be configured to select the designated motion vector from the following list in order:
1. The bottom-left control point motion vector in a constructed affine motion vector predictor.
2. The top-right control point motion vector in the constructed affine motion vector predictor.
3. The top-left control point motion vector in the constructed affine motion vector predictor.
4. A temporal motion vector predictor (e.g., a temporal motion vector predictor for normal, translational motion vector prediction (e.g., the HEVC AMVP candidate list)).
5. The zero motion vector.

In some examples, video encoder 200 and video decoder 300 may be configured to construct the affine AMVP motion vector predictor list without any pruning. That is, duplicate candidates are not removed from the list. In another example, the simplified pruning described above is applied, wherein only one control point motion vector is compared.

Figure 12:
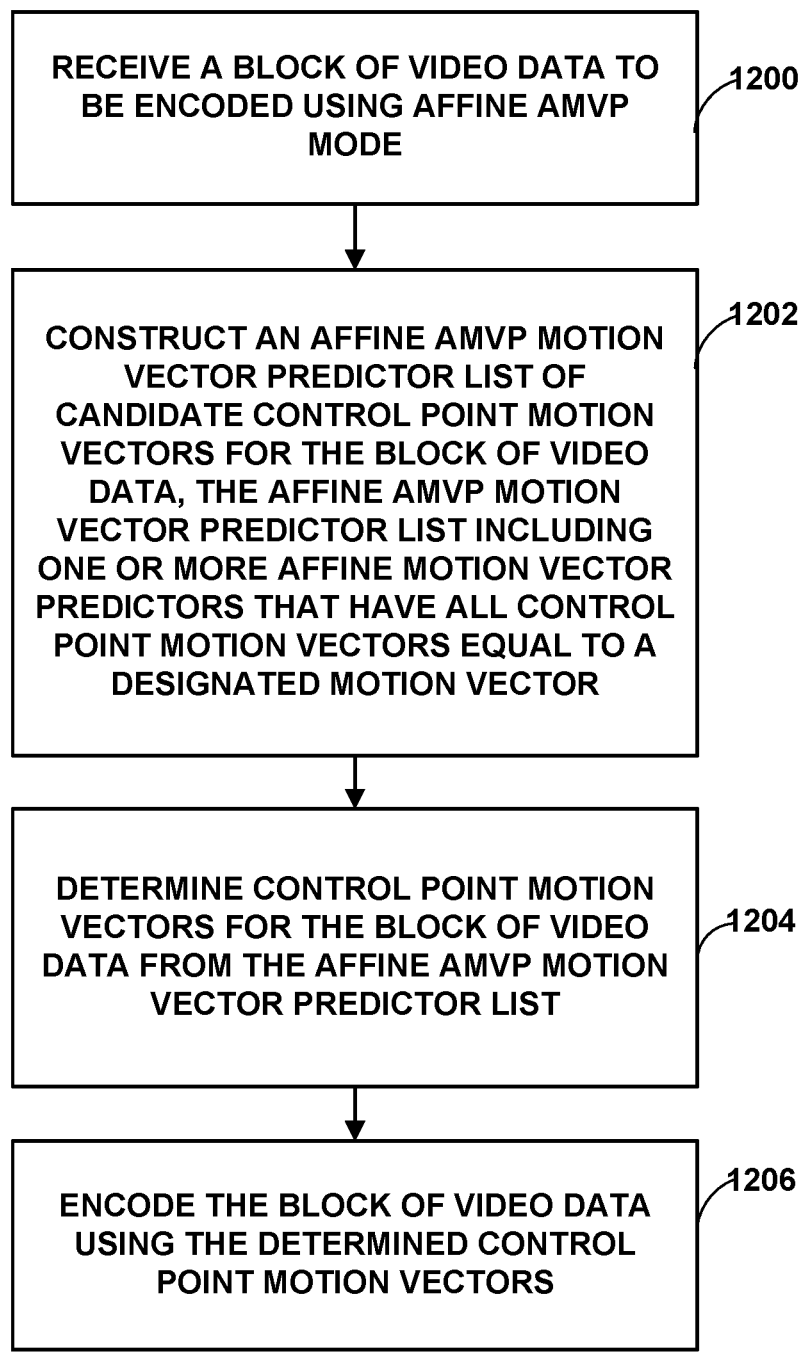
FIG. 12 is a flowchart illustrating an example operation of a video encoder.

FIG. 12 is a flowchart illustrating an example operation of video encoder 200 in accordance with the techniques described above. In one example, video encoder 200 may be configured to receive a block of video data to be encoded using affine advanced motion vector prediction (AMVP) mode (1200), and construct an affine AMVP motion vector predictor list of candidate control point motion vectors for the block of video data, the affine AMVP motion vector predictor list including one or more affine motion vector predictors that have all control point motion vectors equal to a designated motion vector (1202). Video encoder 200 may be further configured to determine control point motion vectors for the block of video data from the affine AMVP motion vector predictor list (1204), and encode the block of video data using the determined control point motion vectors (1206).

Figure 13:
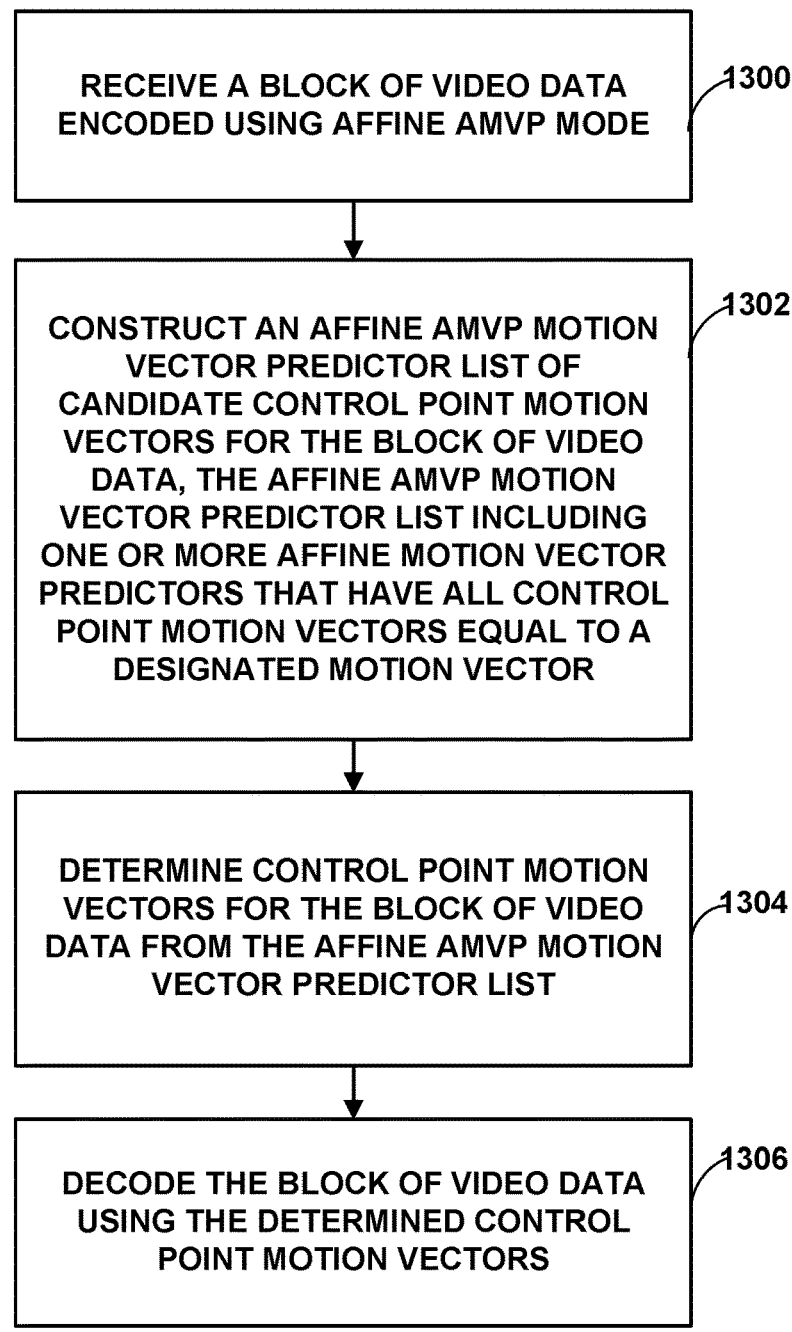
FIG. 13 is a flowchart illustrating an example operation of a video decoder.

FIG. 13 is a flowchart illustrating an example operation of video decoder 300 in accordance with the techniques described above. In one example, video decoder 300 may be configured to receive a block of video data encoded using affine advanced motion vector prediction (AMVP) mode (1300), and construct an affine AMVP motion vector predictor list of candidate control point motion vectors for the block of video data, the affine AMVP motion vector predictor list including one or more affine motion vector predictors that have all control point motion vectors equal to a designated motion vector (1302). Video decoder 300 may be further configured to determine control point motion vectors for the block of video data from the affine AMVP motion vector predictor list (1304), and decode the block of video data using the determined control point motion vectors (1306).

In another example, video encoder 200 and video decoder 300 may be configured to first check two neighboring blocks to determine whether the two neighboring blocks are in the same PU. If the two neighboring blocks are in the same PU, the block of the two neighboring blocks that is later in the checking order is skipped. For example, if A1 is in the same PU as A0, then A1 is skipped. Likewise, if B1 is in the same PU as B0, then B1 is skipped, and if B2 is in the same PU as B0 or A0, then B2 is skipped. After that, when inserting an inherited affine motion vector predictor into the predictor list, video encoder 200 and video decoder 300 may be configured to apply simplified pruning, wherein only one control point MV is compared, as described above. The simplified pruning may be applied to the inherited affine motion vector predictors and/or the other affine motion vector predictors.

In still another example, the simplified pruning is applied to the inherited affine motion vector predictors, and no pruning is applied to the other affine motion vector predictors.

Techniques for affine motion vector predictor list construction for affine merge mode will now be discussed. In the affine merge mode, an inherited affine merge candidate is obtained by deriving an affine motion vector predictor for each reference list if applicable. A modified inherited affine merge candidate is obtained by modifying the selected control point motion vector for each reference list if applicable. A constructed affine merge candidate is obtained by deriving the constructed affine motion vector predictor for each reference list if applicable.

A neighboring candidate block is said to be available for inherited affine merge candidate derivation if the block is inter prediction coded and is coded using affine motion compensation.

In one example technique, video encoder 200 and video decoder 300 may be configured to construct the affine merge candidate list as follows:
1. Add the inherited affine merge candidates derived from neighboring candidate blocks in the order of A0, B0, B1, A1, B2, if available.
2. Add the constructed merge affine candidates in the order of the following control point MVs combination, wherein MV0 is the control point MV at top-left control point, MV1 is at top-right control point, MV2 is at bottom-left control point, and MV3 is at bottom-right control point. MV0 is derived from the first available MV in {B2, B3, A2}, MV1 is derived from the first available of {B0, B1}, and MV2 is derived from the first available of {A0, A1}. MV3 is derived from the temporal merge candidate (e.g., as in HEVC).
   a. {MV0, MV1, MV2}
   b. {MV0, MV1, MV3}
   c. {MV0, MV2, MV3}
   d. {MV1, MV2, MV3}
   e. {MV0, MV1}
   f. {MV1, MV2}
   g. {MV0, MV3}
   h. {MV0, MV2}
   i. {MV1, MV3}
   j. {MV2, MV3}
3. Add the zero MV candidates, wherein each control point MV is a zero MV.

In another example, video encoder 200 and video decoder 300 may be configured to construct the affine merge candidate list as follows:
1. Add the inherited affine merge candidates derived from neighboring candidate blocks in the order of A0, B0, B1, A1, B2, if available.
2. Add the modified inherited affine merge candidates in the same order of inherited affine merge candidates.
3. Add the constructed affine merge candidates in the order of the following control point MVs combination, wherein MV0 is the control point MV at top-left control point, MV1 is at top-right control point, MV2 is at bottom-left control point, and MV3 is at bottom-right control point. MV0 is derived from the first available MV in {B2, B3, A2}, MV1 is derived from the first available of {B0, B1}, and MV2 is derived from the first available of {A0, A1}. MV3 is derived from the temporal merge candidate (e.g., as in HEVC).
   a. {MV0, MV1, MV2}
   b. {MV0, MV1, MV3}
   c. {MV0, MV2, MV3}
   d. {MV1, MV2, MV3}
   e. {MV0, MV1}
   f. {MV1, MV2}
   g. {MV0, MV3}
   h. {MV0, MV2}
   i. {MV1, MV3}
   j. {MV2, MV3}
4. Add the zero MV candidates, wherein each control point MV is a zero MV.

In still another example, video encoder 200 and video decoder 300 may be configured to construct the affine merge candidate list as follows:
1. Add the inherited affine merge candidates derived from neighboring candidate blocks in the order of A0, B0, B1, A1, B2, if available.
2. Add the constructed affine merge candidates in the order of the following control point MVs combination, wherein MV0 is the control point MV at top-left control point, MV1 is at top-right control point, MV2 is at bottom-left control point, and MV3 is at bottom-right control point. MV0 is derived from the first available MV in {B2, B3, A2}, MV1 is derived from the first available of {B0, B1}, and MV2 is derived from the first available of {A0, A1}. MV3 is derived from the temporal merge candidate (e.g., as in HEVC).
 a. {MV0, MV1, MV2}
 b. {MV0, MV1}
 c. {MV1, MV2}
 d. {MV0, MV2}
3. Add the zero MV candidates, wherein each control point MV is a zero MV.

In still another example, video encoder 200 and video decoder 300 may be configured to construct the affine merge candidate list as follows:
1. Add the inherited affine merge candidates derived from neighboring candidate blocks in the order of A0, B0, B1, A1, B2, if available.
2. Add the constructed affine merge candidates in the order of the following control point MVs combination, wherein MV0 is the control point MV at top-left control point, MV1 is at top-right control point, MV2 is at bottom-left control point, and MV3 is at bottom-right control point. MV0 is derived from the first available MV in {B2, B3, A2}, MV1 is derived from the first available of {B0, B1}, and MV2 is derived from the first available of {A0, A1}. MV3 is derived from the temporal merge candidate (e.g., as in HEVC).
 a. {MV0, MV1, MV3}
 b. {MV0, MV2, MV3}
 c. {MV1, MV2, MV3}
 d. {MV0, MV3}
 e. {MV1, MV3}
 f. {MV2, MV3}
3. Add the zero MV candidates, wherein each control point MV is a zero MV.

In still another example, video encoder 200 and video decoder 300 may be configured to construct the affine merge candidate list as follows:
1. Add the inherited affine merge candidates derived from neighboring candidate blocks in the order of A0, B0, B1, A1, B2, if available.
2. Add the modified inherited affine merge candidates in the same order of inherited affine merge candidates.
3. Add the constructed affine merge candidates in the order of the following control point MVs combination, wherein MV0 is the control point MV at top-left control point, MV1 is at top-right control point, MV2 is at bottom-left control point, and MV3 is at bottom-right control point. MV0 is derived from the first available MV in {B2, B3, A2}, MV1 is derived from the first available of {B0, B1}, and MV2 is derived from the first available of {A0, A1}. MV3 is derived from the temporal merge candidate (e.g., as in HEVC).
 a. {MV0, MV1, MV3}
 b. {MV0, MV2, MV3}
 c. {MV1, MV2, MV3}
 d. {MV0, MV3}
 e. {MV1, MV3}
 f. {MV2, MV3}
4. Add the zero MV candidates, wherein each control point MV is a zero MV.

Note that in the above, if three MVs are used and the combination is not {MV0, MV1, MV2}, the candidate is converted to the combination of {MV0, MV1, MV2}. For example, if the combination is {MV1, MV2, MV3}, then the affine motion model is derived, and then MV0 is derived given the affine motion model.

In still another example, video encoder 200 and video decoder 300 may be configured to derive MV1 from the first available of {B0, B1}, and derive MV2 from the first available of {A0, A1}. However, MV0 can be selected from one of {B2, B3, A2} in order. So, the maximum number of constructed affine merge candidates is three.

Other Derivation Techniques for Deriving MV0

Video encoder 200 and video decoder 300 may be configured to derive the control point motion vector MV0 from the inherited affine motion vector predictor. For example, video encoder 200 and video decoder 300 may be configured to derive MV0 from the inherited affine motion vector predictor (MVP) from block B2, B3, or A2.

In one example, video encoder 200 and video decoder 300 may be configured to only derive one MV0.

In some examples, video encoder 200 and video decoder 300 may be configured to check the inherited affine MVP for blocks B2, B3 and A2 in order until the first available is found. If an inherited affine MVP is found, video encoder 200 and video decoder 300 may be configured to use a top-left control point MV as the MV0. Otherwise, video encoder 200 and video decoder 300 may be configured to check the normal translational MVPs for blocks B2, B3 and A2 in order until the first available is found. If a normal translational MVP is found, video encoder 200 and video decoder 300 may be configured to use the normal translational MVP as the MV0.

In another example, video encoder 200 and video decoder 300 may be configured to check the inherited affine MVP for block B2. If an inherited affine MVP is found, video encoder 200 and video decoder 300 may be configured to use a top-left control point MV as the MV0. Otherwise, video encoder 200 and video decoder 300 may be configured to check the normal translational MVPs for blocks B2, B3 and A2 in order until the first available is found. If a normal translational MVP is found, video encoder 200 and video decoder 300 may be configured to use the normal translational MVP as the MV0.

In another example, video encoder 200 and video decoder 300 may be configured to derive multiple control point motion vectors MV0.

In some examples, video encoder 200 and video decoder 300 may be configured to check inherited affine MVPs for blocks B2, B3 and A2 in order. If an inherited affine MVP is found, video encoder 200 and video decoder 300 may be configured to use a top-left control point MV as a candidate of MV0. Then, video encoder 200 and video decoder 300 may be configured to check the normal translational MVPs for blocks B2, B3 and A2 in order. If a normal translational MVP is found, video encoder 200 and video decoder 300 may be configured to use the normal translational MVP as a candidate of MV0. The maximum number of candidates for MV0 can be predefined, for example 2, 3, or other integer numbers. Video encoder 200 and video decoder 300 may be configured to apply a pruning process to remove duplicates.

In some examples, video encoder 200 and video decoder 300 may be configured to check inherited affine MVPs for block B2. If the inherited affine MVP is found, video encoder 200 and video decoder 300 may be configured to use a top-left control point MV as one candidate of MV0. Then, video encoder 200 and video decoder 300 may be configured to check the normal translational MVPs for blocks B2, B3 and A2 in order. If a normal translational MVP is found, video encoder 200 and video decoder 300 may be configured to use the normal translational MVP as a candidate of MV0. The maximum number of candidates for MV0 can be predefined, for example 2, 3, or other integer numbers. Video encoder 200 and video decoder 300 may be configured to apply a pruning process to remove duplicates.

The checking order of B2, B3 and A2 can be switched.

Other Derivation Techniques for Deriving MV1

In some examples, video encoder 200 and video decoder 300 may be configured to derive MV1 by the inherited affine motion vector predictor. For example, video encoder 200 and video decoder 300 may be configured to derive MV1 from the inherited affine MVP from block B0, or B1.

In one method, video encoder 200 and video decoder 300 may be configured to only derive one MV1.

In some examples, video encoder 200 and video decoder 300 may be configured to check inherited affine MVPs for blocks B0 and B1 in order until the first available is found. If an inherited affine MVP is found, video encoder 200 and video decoder 300 may be configured to use a top-left control point MV as the MV1. Otherwise, video encoder 200 and video decoder 300 may be configured to check the normal translational MVPs for blocks B0 and B1 in order until the first available is found. If a normal translational MVP is found, video encoder 200 and video decoder 300 may be configured to use the normal translational MVP used as the MV1.

In another example, multiple MV1 s are derived.

In some examples, video encoder 200 and video decoder 300 may be configured to check inherited affine MVPs for blocks B0 and B1 in order. If an inherited affine MVP is found, video encoder 200 and video decoder 300 may be configured to use a top-left control point MV as one candidate of MV1. Then, video encoder 200 and video decoder 300 may be configured to check the normal translational MVPs for blocks B0 and B1 in order. If a normal translational MVP is found, video encoder 200 and video decoder 300 may be configured to use the normal translational MVP as a candidate of MV1. The maximum number of candidates for MV1 can be predefined, for example 2, 3, or other integer numbers. Video encoder 200 and video decoder 300 may be configured to apply a pruning process to remove duplicates.

The order of checking B0 and B1 can be switched.

Other Derivation Techniques for Deriving MV2

In some examples, video encoder 200 and video decoder 300 may be configured to derive the MV2 by the inherited affine motion vector predictor. For example, video encoder 200 and video decoder 300 may be configured to derive MV2 from the inherited affine MVP from block A0, or A1.

In one example, video encoder 200 and video decoder 300 may be configured to derive only one MV2.

In some examples, video encoder 200 and video decoder 300 may be configured to check inherited affine MVPs for blocks A0 and A1 in order until the first available is found. If an inherited affine MVP is found, then video encoder 200 and video decoder 300 may be configured to use a top-left control point MV as the MV2. Otherwise, video encoder 200 and video decoder 300 may be configured to check the normal translational MVPs for blocks A0 and A1 in order until the first available is found. If a normal translational MVP is found, video encoder 200 and video decoder 300 may be configured to use the normal translational MVP as the MV2.

In another example, video encoder 200 and video decoder 300 may be configured to derive multiple MV2s.

In some examples, video encoder 200 and video decoder 300 may be configured to check inherited affine MVPs for blocks A0 and A1 in order. If an inherited affine MVP is found, then video encoder 200 and video decoder 300 may be configured to use a top-left control point MV as one candidate of MV2. Then, video encoder 200 and video decoder 300 may be configured to check the normal translational MVPs for block A0 and A1 in order. If a normal translational MVP is found, video encoder 200 and video decoder 300 may be configured to use the normal translational MVP as a candidate of MV2. The maximum number of candidates for MV2 can be predefined, for example 2, 3, or other integer numbers. Video encoder 200 and video decoder 300 may be configured to apply a pruning process to remove duplicates.

The order of checking A0 and A1 can be switched.

Other Derivation Techniques for Deriving MV3

In the case of flexible coder order, video encoder 200 and video decoder 300 may be configured to code the blocks at location C0 or/and C1 before a current block. Then, similarly as described above, video encoder 200 and video decoder 300 may be configured to derive MV3 from the inherited affine MVP from C0 or/and C1, and/or derived from the normal translational MVP from C0 and/or C1. Video encoder 200 and video decoder 300 may be configured to derive the MVE by a temporal motion vector predictor (TMVP).

Constructed Affine MVP with Multiple Candidates of MV0

In one example, video encoder 200 and video decoder 300 may be configured to use multiple candidates of MV0, but only one MV1 and one MV2 are used. Then, video encoder 200 and video decoder 300 may be configured to derive multiple constructed affine MVPs based on the multiple candidates of MV0, e.g., the constructed affine MVP is differed by the MV0.

Other Insertion Techniques for Inherited Affine Motion Vector Predictors

The insertion methods described herein can be applied in affine merge candidate list construction.

Other Insertion Techniques for Constructed Affine Motion Vector Predictors

Other insertion orders of constructed affine MVP can be applied.

In some examples, the following applies.
 a. Check {MV0, MV1, MV2}, if multiple candidates of MV0 are available, then check multiple {MV0, MV1, MV2} with the multiple candidates of MV0.
 b. Check {MV0, MV1, MV3}
 c. Check {MV0, MV2, MV3}
 d. Check {MV1, MV2, MV3}
 e. Check {MV0, MV1}
 f. Check {MV0, MV2}

In another example, the following applies.
 a. Check {MV0, MV1, MV2}, if multiple candidates of MV0 are available, then check multiple {MV0, MV1, MV2} with the multiple candidates of MV0.
 b. Check {MV0, MV1, MV3}
 c. Check {MV0, MV2, MV3}
 d. Check {MV1, MV2, MV3}
 e. Check {MV0, MV1}, if multiple candidates of MV0 are available, then check multiple {MV0, MV1} with the multiple candidates of MV0.

In still another example, the following applies.
 a. Check {MV0, MV1, MV2}, if multiple candidates of MV0 are available, then check multiple {MV0, MV1, MV2} with the multiple candidates of MV0.
 b. If MV2 is not available, check {MV0, MV1}. if multiple candidates of MV0 are available, then check multiple {MV0, MV1} with the multiple candidates of MV0.

c. Check {MV0, MV1, MV3} d. Check {MV0, MV2, MV3} e. Check {MV1, MV2, MV3}

In still another example, the following applies.

a. Check {MV0, MV1, MV2}, if multiple candidates of MV0 are available, then check multiple {MV0, MV1, MV2} with the multiple candidates of MV0.

b. Check {MV0, MV1}. if multiple candidates of MV0 are available, then check multiple {MV0, MV1} with the multiple candidates of MV0.

Note that in the case of flexible coding order, and C0/C1 are coded before A0/A1, the MV0 and MV3 described above are switched.

Inserting ATMVP Candidate into the Affine Merge Candidate List

When a separate merge candidate list for sub-PU based merge mode is used, the sub-PU based advanced temporal motion vector prediction (ATMVP) candidate is inserted after the inherited affine merge candidate from A1. In another example, the ATMVP candidate is inserted in the first position of the merge candidate list, e.g., before the affine merge candidate.

In another example of the disclosure, an improved constructed affine motion predictor is described. In some examples, for a conventional constructed affine motion predictor, the motion vector $\vec{v}_0$ at the top-left control point can be predicted by the motion vector at B2, B3 or A3, the motion vector $\vec{v}_1$ at the top-right control point can be predicted by the motion vector at B0 or B1, and the motion vector $\vec{v}_2$ at the left-bottom control point can be predicted by the motion vector at A0 or A1. According to the techniques of this disclosure, an improved constructed affine candidate, $\vec{v}_i$, is first predicted by the inherited affine motion predictor from its immediate neighboring block, if available.

If A3 is affine coded, then $\vec{v}_0$ is derived by the affine motion model of A3, i.e., $\vec{v}_0$ of the inherited affine motion predictor from A3. Otherwise, $\vec{v}_0$ is derived as described for the conventional constructed affine motion predictor.

If B0/B1 is affine coded, then $\vec{v}_1$ is derived by the affine motion model of B0/B1, i.e., $\vec{v}_1$ of the inherited affine motion predictor from B0/B1. Otherwise, $\vec{v}_1$ is derived as described for the conventional constructed affine motion predictor.

If A0/A1 is affine coded, then $\vec{v}_2$ is derived by the affine motion model of A0/A1, i.e., $\vec{v}_2$ of the inherited affine motion predictor from A0/A1. Otherwise, $\vec{v}_2$ is derived as described for the conventional constructed affine motion predictor.

In this way, if the inherited affine motion predictors from A0, A1, B0, B1, B2, B3, A3 are already derived, corresponding control point MVs of the constructed affine motion predictors can be derived together with the inherited affine motion predictors. As such, computational complexity may be reduced.

Adaptive Affine Motion Vector Difference Prediction

Video encoder 200 and video decoder 300 may be configured to predict the motion vector difference (MVD) of the top-right control point and bottom-left control point by the MVD of the top-left control point. Video encoder 200 and video decoder 300 may be configured adaptively apply the MVD prediction. If the affine MVP is an inherited affine MVP or the 3 control-point MVs of the MVP are predicted by the same translational MV, then video encoder 200 and video decoder 300 may be configured to apply the MVD prediction. Otherwise, e.g., the affine MVP is a constructed affine MVP, video encoder 200 and video decoder 300 may be configured to not apply the MVD prediction.

History Based Affine Motion Vector Prediction

As in the history-based motion vector prediction, video encoder 200 and video decoder 300 may be configured to derive an inherited affine MVP from a slice level maintained affine MVP list. Video encoder 200 and video decoder 300 may be configured to update the slice level affine MVP list when a block is coded by affine motion prediction. Video encoder 200 and video decoder 300 may be configured to insert the affine motion parameters used for the block into the affine MVP list. When the number of candidates in the list reaches the predefined maximum, the MVP is popped out (e.g., removed) by the rule of first in first out. When getting an affine MVP from the list, the checking order is the opposite of the insertion order. The history based affine MVP, e.g. the affine MVP from the slice level list, can be inserted after the constructed affine MVP. Note that when inserting the affine motion parameter into the list, the location and the width and height of the current block are also stored.

Affine Motion Vector Predictor Refinement with Motion Vector Difference

Video encoder 200 and video decoder 300 may be configured to refine the affine MVP by one motion vector difference (MVD). Video encoder 200 and video decoder 300 may be configured to construct the affine MVP candidate list as in the affine merge mode described above, except that zero MV candidates are excluded. Then, video encoder 200 and video decoder 300 may be configured to refine the designated control point MV of the selected affine MVP by the merge index by a MVD.

In some examples, the designated control point MV is the top-left control point MV. In another example, the designated control point MV is the top-right control point MV. In still another example, the designated control point MV is the bottom-left control point MV.

In still another example, the designated control point MV depends on the selected affine MVP. For example, if the selected affine MVP is the inherited affine MVP from A0/A1, the designated control point MV for refinement is the top-right control point MV; if the selected affine MVP is the inherited affine MVP from B0/B1, the designated control point MV for refinement is the bottom-left control point MV; if the selected affine MVP is the inherited affine MVP from B2/B3/A2, the designated control point MV for refinement is (width>height? top-right control point MV: bottom-left control point MV); for the other affine MVP, e.g., constructed affine MVP or affine MVP from a slice level list, the designated control point MV for refinement is predefined as top-left control point MV.

If the affine MVP is bi-directional, then video encoder 200 and video decoder 300 may be configured to mirror the MVD for the two directions, therefore only one MVD is signaled, and the one is derived by scaling the signaled MVD.

In some examples, coding of the MVD can be the same as in normal MVD coding.

In another example, coding of the motion vector difference can be the same as in U.S. Provisional Patent Application No. 62/697,860 or as in JVET-K0115 "CE4 Ultimate motion vector expression in JVET-J0024". Wherein, the MVD is expressed as prediction direction information, starting point, motion magnitude, and motion direction. The starting point is the selected affine MVP, and the affine MVP list construction depends on the prediction direction information, i.e., forward prediction, backward prediction, or bi-directional prediction.

Figure 14:
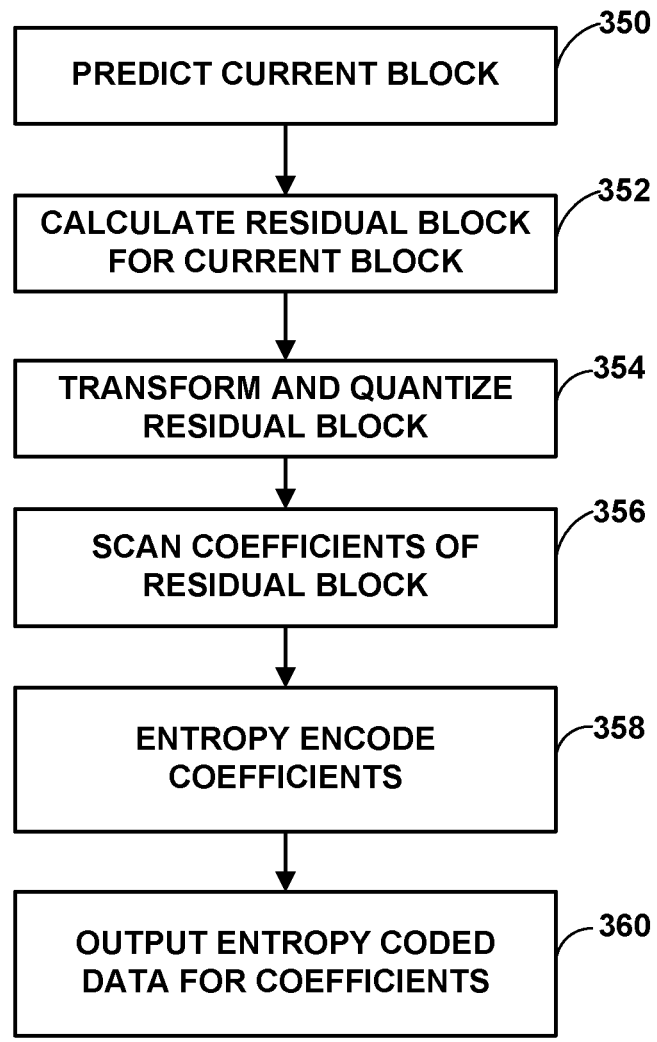
FIG. 14 is a flowchart illustrating another example operation of a video encoder.

FIG. 14 is a flowchart illustrating an example method for encoding a current block. The current block may comprise a current CU. Although described with respect to video encoder 200 (FIGS. 1 and 3), it should be understood that other devices may be configured to perform a method similar to that of FIG. 14.

In this example, video encoder 200 initially predicts the current block (350). For example, video encoder 200 may form a prediction block for the current block. Video encoder 200 may then calculate a residual block for the current block (352). To calculate the residual block, video encoder 200 may calculate a difference between the original, uncoded block and the prediction block for the current block. Video encoder 200 may then transform and quantize coefficients of the residual block (354). Next, video encoder 200 may scan the quantized transform coefficients of the residual block (356). During the scan, or following the scan, video encoder 200 may entropy encode the coefficients (358). For example, video encoder 200 may encode the coefficients using CAVLC or CABAC. Video encoder 200 may then output the entropy coded data for coefficients of the block (360).

Figure 15:
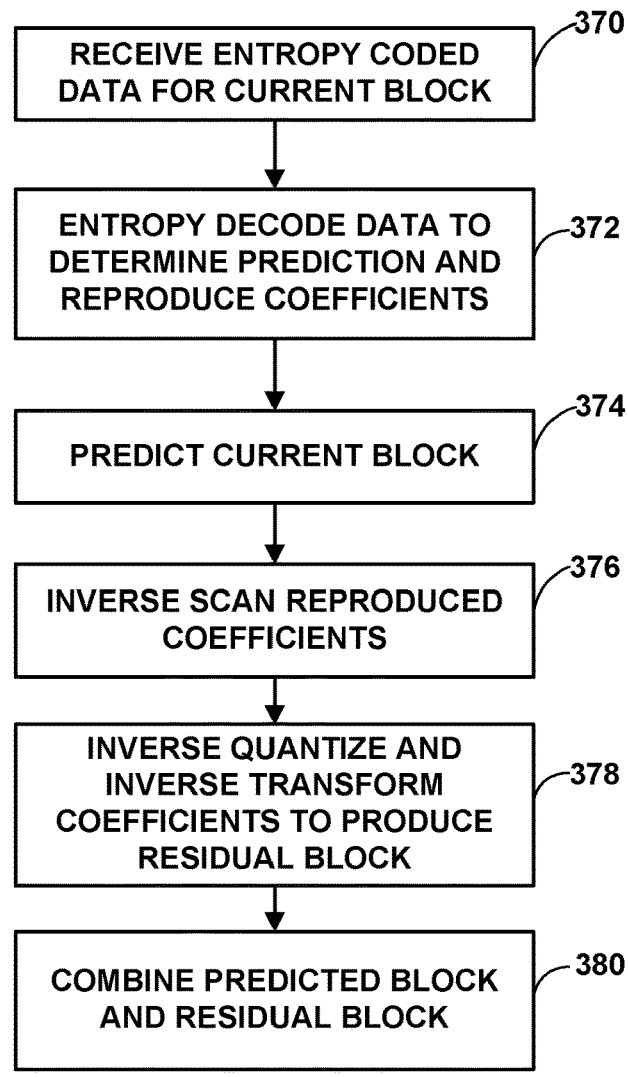
FIG. 15 is a flowchart illustrating another example operation of a video decoder.

FIG. 15 is a flowchart illustrating an example method for decoding a current block of video data. The current block may comprise a current CU. Although described with respect to video decoder 300 (FIGS. 1 and 4), it should be understood that other devices may be configured to perform a method similar to that of FIG. 15.

Video decoder 300 may receive entropy coded data for the current block, such as entropy coded prediction information and entropy coded data for coefficients of a residual block corresponding to the current block (370). Video decoder 300 may entropy decode the entropy coded data to determine prediction information for the current block and to reproduce coefficients of the residual block (372). Video decoder 300 may predict the current block (374), e.g., using an intra- or inter-prediction mode as indicated by the prediction information for the current block, to calculate a prediction block for the current block. Video decoder 300 may then inverse scan the reproduced coefficients (376), to create a block of quantized transform coefficients. Video decoder 300 may then inverse quantize and inverse transform the coefficients to produce a residual block (378). Video decoder 300 may ultimately decode the current block by combining the prediction block and the residual block (380).

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable gate arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method of decoding video data, the method comprising:
   receiving a block of video data encoded using affine advanced motion vector prediction (AMVP) mode;
   constructing an affine AMVP motion vector predictor list of candidate control point motion vectors for the block of video data, wherein the affine AMVP motion vector predictor list includes at least one or more inherited affine motion vector predictors or one or more constructed affine motion vector predictors, and wherein the affine AMVP motion vector predictor list further includes one or more affine motion vector predictors that have all control point motion vectors equal to a designated motion vector;
   determining the designated motion vector from a designated motion vector candidate list in the following order, wherein the designated motion vector candidate list is different than the affine AMVP motion vector predictor list:
   1) a bottom-left control point motion vector in a constructed affine motion vector predictor, wherein the constructed affine motion vector predictor is a translational motion vector used to predict a particular control point motion vector for the affine AMVP mode,
   2) a top-right control point motion vector in the constructed affine motion vector predictor,
   3) a top-left control point motion vector in the constructed affine motion vector predictor,
   4) a temporal motion vector predictor, and
   5) a zero motion vector;
   determining control point motion vectors for the block of video data from the affine AMVP motion vector predictor list; and
   decoding the block of video data using the determined control point motion vectors.

2. The method of claim 1, wherein constructing the affine AMVP motion vector predictor list of candidate control point motion vectors for the block of video data comprises:
   inserting the one or more inherited affine motion vector predictors into the affine AMVP motion vector predictor list, if available;
   inserting, if a number of the one or more inherited affine motion vector predictors is less than a predefined maximum number for the affine AMVP motion vector predictor list, the one or more constructed affine motion vector predictors into the affine AMVP motion vector predictor list, if available; and
   inserting, if a number of the one or more inherited affine motion vector predictors and the one or more constructed affine motion vector predictors is less than the predefined maximum number for the affine AMVP motion vector predictor list, the one or more affine motion vector predictors that have all control point motion vectors equal to the designated motion vector into the affine AMVP motion vector predictor list.

3. The method of claim 1, wherein constructing the affine AMVP motion vector predictor list of candidate control point motion vectors for the block of video data comprises:
   constructing the affine AMVP motion vector predictor list of candidate control point motion vectors for the block of video data without performing a pruning process.

4. The method of claim 1, further comprising:
   deriving the one or more inherited affine motion vector predictors from control point motion vectors of a neighboring block encoded using affine motion prediction.

5. The method of claim 1, further comprising:
   deriving the one or more constructed affine motion vector predictors from motion vectors of neighboring blocks coded using inter prediction.

6. The method of claim 1, wherein the block of video data is decoded using a 6-parameter affine motion model, the method further comprising:
   deriving the one or more constructed affine motion vector predictors from motion vectors of neighboring blocks coded using inter prediction only if all control point motion vectors for the 6-parameter affine motion model are available.

7. The method of claim 1, wherein determining the control point motion vectors for the block comprises:
   receiving an index to the affine AMVP motion vector predictor list;
   receiving a motion vector difference for each of the control point motion vectors for the block;
   retrieving the candidate control point motion vectors associated with the index; and
   adding the motion vector difference for each of the control point motion vectors for the block to the candidate control point motion vectors to determine the control point motion vectors for the block.

8. The method of claim 1, further comprising:
   outputting for display a picture that includes the decoded block of video data.

9. An apparatus configured to decode video data, the apparatus comprising:
   a memory configured to store a block of video data encoded using affine advanced motion vector prediction (AMVP) mode; and
   one or more processors in communication with the memory, the one or more processors configured to:
   receive the block of video data;
   construct an affine AMVP motion vector predictor list of candidate control point motion vectors for the block of video data, wherein the affine AMVP motion vector predictor list includes at least one or more inherited affine motion vector predictors or one or more constructed affine motion vector predictors, and wherein the affine AMVP motion vector predictor list further includes one or more affine motion vector predictors that have all control point motion vectors equal to a designated motion vector;
   determine the designated motion vector from a designated motion vector candidate list in the following order, wherein the designated motion vector candidate list is different than the affine AMVP motion vector predictor list:
   1) a bottom-left control point motion vector in a constructed affine motion vector predictor, wherein the constructed affine motion vector predictor is a translational motion vector used to predict a particular control point motion vector for the affine AMVP mode,
   2) a top-right control point motion vector in the constructed affine motion vector predictor,
   3) a top-left control point motion vector in the constructed affine motion vector predictor,
   4) a temporal motion vector predictor, and
   5) a zero motion vector;

determine control point motion vectors for the block of video data from the affine AMVP motion vector predictor list; and
decode the block of video data using the determined control point motion vectors.

10. The apparatus of claim 9, wherein to construct the affine AMVP motion vector predictor list of candidate control point motion vectors for the block of video data, the one or more processors are configured to:
insert the one or more inherited affine motion vector predictors into the affine AMVP motion vector predictor list, if available;
insert, if a number of the one or more inherited affine motion vector predictors is less than a predefined maximum number for the affine AMVP motion vector predictor list, the one or more constructed affine motion vector predictors into the affine AMVP motion vector predictor list, if available; and
insert, if a number of the one or more inherited affine motion vector predictors and the one or more constructed affine motion vector predictors is less than the predefined maximum number for the affine AMVP motion vector predictor list, the one or more affine motion vector predictors that have all control point motion vectors equal to the designated motion vector into the affine AMVP motion vector predictor list.

11. The apparatus of claim 9, wherein to construct the affine AMVP motion vector predictor list of candidate control point motion vectors for the block of video data, the one or more processors are configured to:
construct the affine AMVP motion vector predictor list of candidate control point motion vectors for the block of video data without performing a pruning process.

12. The apparatus of claim 9, wherein the one or more processors are further configured to:
derive the one or more inherited affine motion vector predictors from control point motion vectors of a neighboring block encoded using affine motion prediction.

13. The apparatus of claim 9, wherein the one or more processors are further configured to:
derive the one or more constructed affine motion vector predictors from motion vectors of neighboring blocks coded using inter prediction.

14. The apparatus of claim 9, wherein the block of video data is decoded using a 6-parameter affine motion model, and wherein the one or more processors are further configured to:
derive the one or more constructed affine motion vector predictors from motion vectors of neighboring blocks coded using inter prediction only if all control point motion vectors for the 6-parameter affine motion model are available.

15. The apparatus of claim 9, wherein to determine the control point motion vectors for the block, the one or more processors are configured to:
receive an index to the affine AMVP motion vector predictor list;
receive a motion vector difference for each of the control point motion vectors for the block;
retrieve the candidate control point motion vectors associated with the index; and
add the motion vector difference for each of the control point motion vectors for the block to the candidate control point motion vectors to determine the control point motion vectors for the block.

16. The apparatus of claim 9, further comprising:
a display configured to display a picture that includes the decoded block of video data.

17. An apparatus configured to decode video data, the apparatus comprising:
means for receiving a block of video data encoded using affine advanced motion vector prediction (AMVP) mode;
means for constructing an affine AMVP motion vector predictor list of candidate control point motion vectors for the block of video data, wherein the affine AMVP motion vector predictor list further includes at least one or more inherited affine motion vector predictors or one or more constructed affine motion vector predictors, and wherein the affine AMVP motion vector predictor list further includes one or more affine motion vector predictors that have all control point motion vectors equal to a designated motion vector;
means for determining the designated motion vector from a designated motion vector candidate list in the following order, wherein the designated motion vector candidate list is different than the affine AMVP motion vector predictor list:
1) a bottom-left control point motion vector in a constructed affine motion vector predictor, wherein the constructed affine motion vector predictor is a translational motion vector used to predict a particular control point motion vector for the affine AMVP mode,
2) a top-right control point motion vector in the constructed affine motion vector predictor,
3) a top-left control point motion vector in the constructed affine motion vector predictor,
4) a temporal motion vector predictor, and
5) a zero motion vector;
means for determining control point motion vectors for the block of video data from the affine AMVP motion vector predictor list; and
means for decoding the block of video data using the determined control point motion vectors.

18. The apparatus of claim 17, wherein the means for constructing the affine AMVP motion vector predictor list of candidate control point motion vectors for the block of video data comprises:
means for inserting the one or more inherited affine motion vector predictors into the affine AMVP motion vector predictor list, if available;
means for inserting, if a number of the one or more inherited affine motion vector predictors is less than a predefined maximum number for the affine AMVP motion vector predictor list, the one or more constructed affine motion vector predictors into the affine AMVP motion vector predictor list, if available; and
means for inserting, if a number of the one or more inherited affine motion vector predictors and the one or more constructed affine motion vector predictors is less than the predefined maximum number for the affine AMVP motion vector predictor list, the one or more affine motion vector predictors that have all control point motion vectors equal to the designated motion vector into the affine AMVP motion vector predictor list.

19. The apparatus of claim 17, wherein the means for constructing the affine AMVP motion vector predictor list of candidate control point motion vectors for the block of video data comprises:

means for constructing the affine AMVP motion vector predictor list of candidate control point motion vectors for the block of video data without performing a pruning process.

20. A non-transitory computer-readable storage medium storing instructions that, when executed, cause one or more processors to:
receive a block of video data encoded using affine advanced motion vector prediction (AMVP) mode;
construct an affine AMVP motion vector predictor list of candidate control point motion vectors for the block of video data, wherein the affine AMVP motion vector predictor list further includes at least one or more inherited affine motion vector predictors or one or more constructed affine motion vector predictors, and wherein the affine AMVP motion vector predictor list further includes one or more affine motion vector predictors that have all control point motion vectors equal to a designated motion vector;
determine the designated motion vector from a designated motion vector candidate list in the following order, wherein the designated motion vector candidate list is different than the affine AMVP motion vector predictor list:
1) a bottom-left control point motion vector in a constructed affine motion vector predictor, wherein the constructed affine motion vector predictor is a translational motion vector used to predict a particular control point motion vector for the affine AMVP mode,
2) a top-right control point motion vector in the constructed affine motion vector predictor,
3) a top-left control point motion vector in the constructed affine motion vector predictor,
4) a temporal motion vector predictor, and
5) a zero motion vector;
determine control point motion vectors for the block of video data from the affine AMVP motion vector predictor list; and
decode the block of video data using the determined control point motion vectors.

21. The non-transitory computer-readable storage medium of claim 20, wherein to construct the affine AMVP motion vector predictor list of candidate control point motion vectors for the block of video data, the instructions cause the one or more processors to:
insert the one or more inherited affine motion vector predictors into the affine AMVP motion vector predictor list, if available;
insert, if a number of the one or more inherited affine motion vector predictors is less than a predefined maximum number for the affine AMVP motion vector predictor list, the one or more constructed affine motion vector predictors into the affine AMVP motion vector predictor list, if available; and
insert, if a number of the one or more inherited affine motion vector predictors and the one or more constructed affine motion vector predictors is less than the predefined maximum number for the affine AMVP motion vector predictor list, the one or more affine motion vector predictors that have all control point motion vectors equal to the designated motion vector into the affine AMVP motion vector predictor list.

22. The non-transitory computer-readable storage medium of claim 20, wherein to construct the affine AMVP motion vector predictor list of candidate control point motion vectors for the block of video data, the instructions cause the one or more processors to:
construct the affine AMVP motion vector predictor list of candidate control point motion vectors for the block of video data without performing a pruning process.

23. A method of encoding video data, the method comprising:
receiving a block of video data to be encoded using affine advanced motion vector prediction (AMVP) mode;
constructing an affine AMVP motion vector predictor list of candidate control point motion vectors for the block of video data, wherein the affine AMVP motion vector predictor list further includes at least one or more inherited affine motion vector predictors or one or more constructed affine motion vector predictors, and wherein the affine AMVP motion vector predictor list further includes one or more affine motion vector predictors that have all control point motion vectors equal to a designated motion vector;
determining the designated motion vector from a designated motion vector candidate list in the following order, wherein the designated motion vector candidate list is different than the affine AMVP motion vector predictor list:
1) a bottom-left control point motion vector in a constructed affine motion vector predictor, wherein the constructed affine motion vector predictor is a translational motion vector used to predict a particular control point motion vector for the affine AMVP mode,
2) a top-right control point motion vector in the constructed affine motion vector predictor,
3) a top-left control point motion vector in the constructed affine motion vector predictor,
4) a temporal motion vector predictor, and
5) a zero motion vector;
determining control point motion vectors for the block of video data from the affine AMVP motion vector predictor list; and
encoding the block of video data using the determined control point motion vectors.

24. The method of claim 23, wherein constructing the affine AMVP motion vector predictor list of candidate control point motion vectors for the block of video data comprises:
inserting the one or more inherited affine motion vector predictors into the affine AMVP motion vector predictor list, if available;
inserting, if a number of the one or more inherited affine motion vector predictors is less than a predefined maximum number for the affine AMVP motion vector predictor list, the one or more constructed affine motion vector predictors into the affine AMVP motion vector predictor list, if available; and
inserting, if a number of the one or more inherited affine motion vector predictors and the one or more constructed affine motion vector predictors is less than the predefined maximum number for the affine AMVP motion vector predictor list, the one or more affine motion vector predictors that have all control point motion vectors equal to the designated motion vector into the affine AMVP motion vector predictor list.

25. The method of claim 23, wherein constructing the affine AMVP motion vector predictor list of candidate control point motion vectors for the block of video data comprises:

constructing the affine AMVP motion vector predictor list of candidate control point motion vectors for the block of video data without performing a pruning process.

26. The method of claim 23, further comprising:
deriving the one or more inherited affine motion vector predictors from control point motion vectors of a neighboring block coded using affine motion prediction.

27. The method of claim 23, further comprising:
deriving the one or more constructed affine motion vector predictors from motion vectors of neighboring blocks coded using inter prediction.

28. The method of claim 23, wherein the block of video data is encoded using a 6-parameter affine motion model, the method further comprising:
deriving the one or more constructed affine motion vector predictors from motion vectors of neighboring blocks coded using inter prediction only if all control point motion vectors for the 6-parameter affine motion model are available.

29. The method of claim 23, further comprising:
determining candidate control point motion vectors in the affine AMVP motion vector predictor;
encoding an index to the affine AMVP motion vector predictor list corresponding to the determined candidate control point motion vectors;
determining a motion vector difference for each of the control point motion vectors for the block relative to the determined candidate control point motion vectors; and
encoding the motion vector differences.

30. The method of claim 23, further comprising:
capturing a picture that includes the block of video data.

31. An apparatus configured to encode video data, the apparatus comprising:
a memory configured to store a block of video data to be encoded using affine advanced motion vector prediction (AMVP) mode; and
one or more processors in communication with the memory, the one or more processors configured to:
receive the block of video data;
construct an affine AMVP motion vector predictor list of candidate control point motion vectors for the block of video data, wherein the affine AMVP motion vector predictor list further includes at least one or more inherited affine motion vector predictors or one or more constructed affine motion vector predictors, and wherein the affine AMVP motion vector predictor list further includes one or more affine motion vector predictors that have all control point motion vectors equal to a designated motion vector;
determine the designated motion vector from a designated motion vector candidate list in the following order, wherein the designated motion vector candidate list is different than the affine AMVP motion vector predictor list:
1) a bottom-left control point motion vector in a constructed affine motion vector predictor, wherein the constructed affine motion vector predictor is a translational motion vector used to predict a particular control point motion vector for the affine AMVP mode,
2) a top-right control point motion vector in the constructed affine motion vector predictor,
3) a top-left control point motion vector in the constructed affine motion vector predictor,
4) a temporal motion vector predictor, and
5) a zero motion vector;
determine control point motion vectors for the block of video data from the affine AMVP motion vector predictor list; and
encode the block of video data using the determined control point motion vectors.

32. The apparatus of claim 31, wherein to construct the affine AMVP motion vector predictor list of candidate control point motion vectors for the block of video data, the one or more processors are configured to:
insert the one or more inherited affine motion vector predictors into the affine AMVP motion vector predictor list, if available;
insert, if a number of the one or more inherited affine motion vector predictors is less than a predefined maximum number for the affine AMVP motion vector predictor list, the one or more constructed affine motion vector predictors into the affine AMVP motion vector predictor list, if available; and
insert, if a number of the one or more inherited affine motion vector predictors and the one or more constructed affine motion vector predictors is less than the predefined maximum number for the affine AMVP motion vector predictor list, the one or more affine motion vector predictors that have all control point motion vectors equal to the designated motion vector into the affine AMVP motion vector predictor list.

33. The apparatus of claim 31, wherein to construct the affine AMVP motion vector predictor list of candidate control point motion vectors for the block of video data, the one or more processors are configured to:
construct the affine AMVP motion vector predictor list of candidate control point motion vectors for the block of video data without performing a pruning process.

34. The apparatus of claim 31, wherein the one or more processors are further configured to:
derive the one or more inherited affine motion vector predictors from control point motion vectors of a neighboring block coded using affine motion prediction.

35. The apparatus of claim 31, wherein the one or more processors are further configured to:
derive the one or more constructed affine motion vector predictors from motion vectors of neighboring blocks coded using inter prediction.

36. The apparatus of claim 31, wherein the block of video data is to be encoded using a 6-parameter affine motion model, and wherein the one or more processors are further configured to:
derive the one or more constructed affine motion vector predictors from motion vectors of neighboring blocks coded using inter prediction only if all control point motion vectors for the 6-parameter affine motion model are available.

37. The apparatus of claim 31, wherein the one or more processors are further configured to:
determine candidate control point motion vectors in the affine AMVP motion vector predictor;
encode an index to the affine AMVP motion vector predictor list corresponding to the determined candidate control point motion vectors;
determine a motion vector difference for each of the control point motion vectors for the block relative to the determined candidate control point motion vectors; and
encode the motion vector differences.

38. The apparatus of claim 31, further comprising:
a camera configured to capture a picture that includes the block of video data.

39. An apparatus configured to encode video data, the apparatus comprising:
means for receiving a block of video data to be encoded using affine advanced motion vector prediction (AMVP) mode;
means for constructing an affine AMVP motion vector predictor list of candidate control point motion vectors for the block of video data, wherein the affine AMVP motion vector predictor list further includes at least one or more inherited affine motion vector predictors or one or more constructed affine motion vector predictors, and wherein the affine AMVP motion vector predictor list further includes one or more affine motion vector predictors that have all control point motion vectors equal to a designated motion vector;
means for determining the designated motion vector from a designated motion vector candidate list in the following order, wherein the designated motion vector candidate list is different than the affine AMVP motion vector predictor list:
1) a bottom-left control point motion vector in a constructed affine motion vector predictor, wherein the constructed affine motion vector predictor is a translational motion vector used to predict a particular control point motion vector for the affine AMVP mode,
2) a top-right control point motion vector in the constructed affine motion vector predictor,
3) a top-left control point motion vector in the constructed affine motion vector predictor,
4) a temporal motion vector predictor, and
5) a zero motion vector;
means for determining control point motion vectors for the block of video data from the affine AMVP motion vector predictor list; and
means for encoding the block of video data using the determined control point motion vectors.

40. The apparatus of claim 39, wherein the means for constructing the affine AMVP motion vector predictor list of candidate control point motion vectors for the block of video data comprises:
means for inserting the one or more inherited affine motion vector predictors into the affine AMVP motion vector predictor list, if available;
means for inserting, if a number of the one or more inherited affine motion vector predictors is less than a predefined maximum number for the affine AMVP motion vector predictor list, the one or more constructed affine motion vector predictors into the affine AMVP motion vector predictor list, if available; and
means for inserting, if a number of the one or more inherited affine motion vector predictors and the one or more constructed affine motion vector predictors is less than the predefined maximum number for the affine AMVP motion vector predictor list, the one or more affine motion vector predictors that have all control point motion vectors equal to the designated motion vector into the affine AMVP motion vector predictor list.

41. The apparatus of claim 39, wherein the means for constructing the affine AMVP motion vector predictor list of candidate control point motion vectors for the block of video data comprises:
means for constructing the affine AMVP motion vector predictor list of candidate control point motion vectors for the block of video data without performing a pruning process.

42. A non-transitory computer-readable storage medium storing instructions that, when executed, cause one or more processors to:
receive a block of video data to be encoded using affine advanced motion vector prediction (AMVP) mode;
construct an affine AMVP motion vector predictor list of candidate control point motion vectors for the block of video data, wherein the affine AMVP motion vector predictor list further includes at least one or more inherited affine motion vector predictors or one or more constructed affine motion vector predictors, and wherein the affine AMVP motion vector predictor list further includes one or more affine motion vector predictors that have all control point motion vectors equal to a designated motion vector;
determine the designated motion vector from a designated motion vector candidate list in the following order, wherein the designated motion vector candidate list is different than the affine AMVP motion vector predictor list:
1) a bottom-left control point motion vector in a constructed affine motion vector predictor, wherein the constructed affine motion vector predictor is a translational motion vector used to predict a particular control point motion vector for the affine AMVP mode,
2) a top-right control point motion vector in the constructed affine motion vector predictor,
3) a top-left control point motion vector in the constructed affine motion vector predictor,
4) a temporal motion vector predictor, and
5) a zero motion vector;
determine control point motion vectors for the block of video data from the affine AMVP motion vector predictor list; and
encode the block of video data using the determined control point motion vectors.

43. The non-transitory computer-readable storage medium of claim 42, wherein to construct the affine AMVP motion vector predictor list of candidate control point motion vectors for the block of video data, the instructions cause the one or more processors to:
insert the one or more inherited affine motion vector predictors into the affine AMVP motion vector predictor list, if available;
insert, if a number of the one or more inherited affine motion vector predictors is less than a predefined maximum number for the affine AMVP motion vector predictor list, the one or more constructed affine motion vector predictors into the affine AMVP motion vector predictor list, if available; and
insert, if a number of the one or more inherited affine motion vector predictors and the one or more constructed affine motion vector predictors is less than the predefined maximum number for the affine AMVP motion vector predictor list, the one or more affine motion vector predictors that have all control point motion vectors equal to the designated motion vector into the affine AMVP motion vector predictor list.

44. The non-transitory computer-readable storage medium of claim 42, wherein to construct the affine AMVP motion vector predictor list of candidate control point motion vectors for the block of video data, the instructions cause the one or more processors to:
    construct the affine AMVP motion vector predictor list of candidate control point motion vectors for the block of video data without performing a pruning process.

* * * * *